(12) United States Patent
Burke

(10) Patent No.: US 10,949,849 B2
(45) Date of Patent: *Mar. 16, 2021

(54) TRANSMITTER FOR TRANSMITTING A SECURE ACCESS SIGNAL

(71) Applicant: CPC Patent Technologies Pty Ltd., Surfers Paradise (AU)

(72) Inventor: Christopher John Burke, Hurstville (AU)

(73) Assignee: CPC Patent Technologies Pty Ltd., Surfers Paradise (AU)

( * ) Notice: Subject to any disclaimer, the term of this patent is extended or adjusted under 35 U.S.C. 154(b) by 0 days.

This patent is subject to a terminal disclaimer.

(21) Appl. No.: 16/717,270

(22) Filed: Dec. 17, 2019

(65) Prior Publication Data

US 2020/0372512 A1 Nov. 26, 2020

Related U.S. Application Data

(63) Continuation of application No. 15/213,661, filed on Jul. 19, 2016, now Pat. No. 10,685,353, which is a
(Continued)

(30) Foreign Application Priority Data

Oct. 22, 2007 (AU) ................................ 2007905760
Feb. 13, 2008 (AU) ................................ 2008900672

(51) Int. Cl.
G06Q 20/40 (2012.01)
H04L 9/32 (2006.01)
(Continued)

(52) U.S. Cl.
CPC ... G06Q 20/40145 (2013.01); G06K 9/00885 (2013.01); G06Q 20/3278 (2013.01);
(Continued)

(58) Field of Classification Search
None
See application file for complete search history.

(56) References Cited

U.S. PATENT DOCUMENTS 4,700,055 A * 10/1987 Kashkashian, Jr. .........................
G06Q 20/341
235/379
4,924,078 A 5/1990 Sant' Anselmo et al.
(Continued)

FOREIGN PATENT DOCUMENTS

EP 1637957 A1 3/2006
WO 2005036357 A2 4/2005
(Continued)

OTHER PUBLICATIONS

U.S. Appl. No. 15/213,661, "Notice of Allowance", dated Feb. 6, 2020, 11 pages.
(Continued)

Primary Examiner — Benyam Haile
Assistant Examiner — Muhammad Adnan
(74) Attorney, Agent, or Firm — TraskBritt

(57) ABSTRACT

A transmitter (116) for transmitting a secure access signal to a system (117) for providing secure access to a controlled item (111) is disclosed. The access is dependent on information contained in the secure access signal. The transmitter (116) comprises a biometric sensor (121) for receiving a biometric signal and a processor (1005) for matching the biometric signal against members of a database (105) of biometric signatures. The transmitter (116) comprises enabling means (e.g., 127) for enabling an inductive circuit, based on the matching of the biometric signal, to transmit the secure access signal conveying the information to the system (117) upon the inductive circuit being placed within range of a radio frequency field emitted by the system (117).

14 Claims, 15 Drawing Sheets

Related U.S. Application Data continuation of application No. 14/308,091, filed on Jun. 18, 2014, now abandoned, which is a continuation of application No. 12/738,663, filed as application No. PCT/AU2008/001490 on Oct. 8, 2008, now abandoned.

(51) Int. Cl.
| | |
|---|---|
| *G06Q 20/32* | (2012.01) |
| *G07F 7/08* | (2006.01) |
| *G06Q 20/34* | (2012.01) |
| *G06K 9/00* | (2006.01) |
| *G07C 9/25* | (2020.01) |
| *G07C 9/26* | (2020.01) |
| *H04L 9/06* | (2006.01) |
| *H04L 9/08* | (2006.01) |
| *H04L 9/30* | (2006.01) |
| *G07C 9/00* | (2020.01) |

(52) U.S. Cl.
CPC ......... *G06Q 20/352* (2013.01); *G06Q 20/354* (2013.01); *G07C 9/257* (2020.01); *G07F 7/0893* (2013.01); *H04L 9/0625* (2013.01); *H04L 9/0631* (2013.01); *H04L 9/0861* (2013.01); *H04L 9/302* (2013.01); *H04L 9/3231* (2013.01); *H04L 9/3247* (2013.01); *G07C 9/00182* (2013.01); *G07C 9/00563* (2013.01); *G07C 9/26* (2020.01); *H04L 2209/56* (2013.01); *H04L 2209/805* (2013.01); *H04L 2463/102* (2013.01)

(56) References Cited

U.S. PATENT DOCUMENTS

| | | | | |
|---|---|---|---|---|
| 4,972,475 | A * | 11/1990 | Sant'Anselmo | G07D 7/20 380/27 |
| 5,266,781 | A | 11/1993 | Warwick et al. | |
| 5,280,527 | A * | 1/1994 | Gullman | G07F 7/1008 713/184 |
| 5,331,176 | A | 7/1994 | Sant' Anselmo et al. | |
| 5,590,038 | A * | 12/1996 | Pitroda | G06Q 20/3415 705/41 |
| 5,770,843 | A * | 6/1998 | Rose | G06Q 20/227 235/375 |
| 6,318,633 | B1 | 1/2001 | Drexler | |
| 6,182,891 | B1 * | 2/2001 | Furuhashi | G06K 19/08 235/379 |
| 6,315,195 | B1 * | 11/2001 | Ramachandran | G06K 7/0004 235/380 |
| 6,588,658 | B1 | 7/2003 | Blank | |
| 6,941,279 | B1 | 9/2005 | Sullivan | |
| 6,957,337 | B1 * | 10/2005 | Chainer | G06F 21/32 713/186 |
| 7,083,094 | B2 * | 8/2006 | Cooper | G06K 19/06 235/380 |
| 7,252,240 | B1 * | 8/2007 | Jones | G06K 19/07732 235/441 |
| 7,328,850 | B2 * | 2/2008 | Sines | G06K 19/06187 235/487 |
| 7,374,079 | B2 * | 5/2008 | Nam | G06Q 20/04 235/379 |
| 7,484,659 | B2 * | 2/2009 | Johanns | G07F 7/12 235/380 |
| 7,640,041 | B2 | 12/2009 | Ragan | |
| 7,644,042 | B2 * | 1/2010 | Ramavarjula | G06Q 20/10 705/44 |
| 7,731,086 | B2 | 6/2010 | Saunders | |
| 7,797,237 | B2 * | 9/2010 | Kim | G06Q 20/202 705/40 |
| 7,814,332 | B2 * | 10/2010 | Beenau | G06Q 20/04 713/186 |
| 7,949,609 | B2 | 5/2011 | Colella | |
| 7,992,792 | B2 * | 8/2011 | Van Rensburg | G07F 7/1008 235/492 |
| 8,002,175 | B2 * | 8/2011 | Kuriyama | G06K 17/0022 235/379 |
| 8,089,339 | B2 | 1/2012 | Mikan et al. | |
| 8,160,959 | B2 * | 4/2012 | Rackley, III | G06Q 20/042 705/39 |
| 8,229,852 | B2 * | 7/2012 | Carlson | G06Q 20/382 705/44 |
| 8,299,895 | B2 * | 10/2012 | Harris | G08C 17/00 340/5.72 |
| 8,528,812 | B2 * | 9/2013 | Gannon | G06K 7/10386 235/380 |
| 8,676,249 | B2 * | 3/2014 | Rosenberg | B60B 33/0039 455/550.1 |
| 8,768,838 | B1 * | 7/2014 | Hoffman | G06Q 40/00 705/44 |
| 10,055,714 | B2 * | 8/2018 | Zhou | G06Q 20/3224 |
| 10,445,837 | B2 * | 10/2019 | Andringa | G06Q 40/025 |
| 2001/0034717 | A1 | 10/2001 | Whitworth | |
| 2002/0096561 | A1 | 7/2002 | Sullivan | |
| 2002/0144128 | A1 | 10/2002 | Rahman et al. | |
| 2002/0167500 | A1 * | 11/2002 | Gelbman | G09G 3/344 345/204 |
| 2003/0119568 | A1 * | 6/2003 | Menard | H04W 52/0229 455/572 |
| 2003/0129965 | A1 * | 7/2003 | Siegel | G06F 21/32 455/411 |
| 2003/0130955 | A1 | 7/2003 | Hawthorne | |
| 2003/0226041 | A1 * | 12/2003 | Palmer | G07C 9/257 726/5 |
| 2004/0049451 | A1 * | 3/2004 | Berardi | G06Q 20/14 705/39 |
| 2004/0117627 | A1 * | 6/2004 | Brewington | H04N 1/32203 713/176 |
| 2004/0232220 | A1 * | 11/2004 | Beenau | G06Q 20/40145 235/380 |
| 2004/0235450 | A1 * | 11/2004 | Rosenberg | G06Q 20/3255 455/406 |
| 2004/0256451 | A1 | 12/2004 | Goman et al. | |
| 2005/0001711 | A1 * | 1/2005 | Doughty | G06Q 20/40145 340/5.74 |
| 2005/0012594 | A1 * | 1/2005 | Shim | B60R 25/24 340/5.72 |
| 2005/0130735 | A1 * | 6/2005 | Ellis | G07F 17/3251 463/25 |
| 2005/0225430 | A1 * | 10/2005 | Seifert | G06F 21/32 340/5.53 |
| 2005/0240778 | A1 * | 10/2005 | Saito | H04L 63/0428 713/186 |
| 2005/0253683 | A1 * | 11/2005 | Lowe | G06K 19/0723 340/5.53 |
| 2006/0161789 | A1 * | 7/2006 | Doughty | G06Q 20/4014 713/186 |
| 2006/0174353 | A1 * | 8/2006 | Ryal | G11B 20/00275 726/31 |
| 2006/0210126 | A1 * | 9/2006 | Cho | G07C 9/37 382/124 |
| 2006/0278704 | A1 * | 12/2006 | Saunders | G07B 15/04 235/382 |
| 2006/0280149 | A1 * | 12/2006 | Kuhl | H04B 5/0062 370/338 |
| 2007/0001582 | A1 | 1/2007 | Jalkanen | |
| 2007/0001852 | A1 * | 1/2007 | Jalkanen | G06F 21/10 340/572.1 |
| 2007/0024551 | A1 | 2/2007 | Gelbman | |
| 2007/0102510 | A1 | 5/2007 | Beemer et al. | |
| 2007/0109101 | A1 * | 5/2007 | Colby | G06K 19/0723 340/10.4 |
| 2007/0118474 | A1 | 5/2007 | Tushie et al. | |
| 2007/0123299 | A1 * | 5/2007 | Ragan | H04W 52/0274 455/556.1 |
| 2007/0131759 | A1 * | 6/2007 | Cox | G06K 19/0718 235/380 |
| 2007/0141984 | A1 | 6/2007 | Kuehnel et al. | |

(56) References Cited

U.S. PATENT DOCUMENTS

| | | | | |
|---|---|---|---|---|
| 2007/0174206 | A1* | 7/2007 | Colella | G06Q 30/06 705/64 |
| 2007/0185718 | A1* | 8/2007 | Di Mambro | G07C 9/37 704/273 |
| 2007/0239603 | A1* | 10/2007 | Lasater | G06Q 20/04 705/41 |
| 2007/0290792 | A1* | 12/2007 | Tsuchimochi | B60R 25/2072 340/5.61 |
| 2008/0128513 | A1* | 6/2008 | Hammad | G06Q 20/16 235/492 |
| 2008/0229400 | A1* | 9/2008 | Burke | H04L 63/0861 726/7 |
| 2008/0238610 | A1* | 10/2008 | Rosenberg | G06Q 30/0281 340/5.7 |
| 2009/0212781 | A1* | 8/2009 | Bertness | G06Q 99/00 324/426 |
| 2010/0049659 | A1* | 2/2010 | Cassone | G06F 21/34 705/64 |
| 2010/0253470 | A1* | 10/2010 | Burke | H04L 9/3231 340/5.82 |
| 2010/0332392 | A1* | 12/2010 | Ueno | G06Q 20/40145 705/44 |
| 2012/0150601 | A1* | 6/2012 | Fisher | H04W 4/18 705/14.23 |
| 2014/0319212 | A1* | 10/2014 | Gannon | G06Q 20/327 235/380 |
| 2016/0086161 | A1* | 3/2016 | Zhou | G06Q 20/3274 705/44 |
| 2016/0239694 | A1* | 8/2016 | Chin | G07C 9/00896 |
| 2018/0068311 | A1* | 3/2018 | Lesesky | G06Q 20/3226 |
| 2018/0158036 | A1* | 6/2018 | Zhou | H04L 67/104 |

FOREIGN PATENT DOCUMENTS

| | | | |
|---|---|---|---|
| WO | 2008031143 | A1 | 3/2008 |
| WO | 2008/043125 | A1 | 4/2008 |

OTHER PUBLICATIONS

Extended European Search Report, EP Application No. 17189130, dated Nov. 17, 2017.
Written Submission by the European Patent Office in related EP Application No. 0880125.0 dated Dec. 21, 2016, all pages.
Humphrey Cheung, Multi-chip RFID packages to substitute multiple RFID cards, Tom's Hardware (website), dated Feb. 14, 2006, available at: <http://www.tomshardware.com/news/rfid-mit-rsa-2006, 2270.html>, accessed Feb. 27, 2017, all pages.
European Patent Application No. 08800125, Supplemental European Search Report, dated Jan. 8, 2013, all pages.
Australian Patent Application No. 2012203563, Patent Examination Report No. 1, dated Jan. 11, 2013, all pages.
Written Opinion for Corresponding Singapore Application No. 201101591-4, dated Aug. 16, 2011, all pages.
Australian Patent Office International-Type Search Report, national Application No. 2008900672, dated Jul. 9, 2008, all pages.
PCT International Preliminary Report on Patentability, PCT International Application PCT/AU2008/001490, dated Apr. 27, 2010, all pages.
Australian Patent Office Examiner's first report on Patent Application No. 2008316289, dated Aug. 12, 2010, all pages.
PCT International Search Report of PCT International Application No. PCT/AU2008/004190, dated Nov. 21, 2008, all pages.
European Patent Application No. 08800125.0, Examination Report Communication pursuant to Article 94(3) EPC, dated Jun. 9, 2015, all pages.
Australian Patent Application No. 2014240323, Australian Patent Office Patent Examination Report No. 1, dated Feb. 4, 2015, all pages.
Singapore Patent Application No. 201101591-4, Examination Report, dated Oct. 16, 2012, all pages.
Chinese Patent Application No. 200880122424.8, First Office Action dated Jul. 18, 2012, all pages.
Chinese Patent Application No. 200880122424.8, Second Office Action dated Mar. 22, 2013, all pages.
Chinese Patent Application No. 200880122424.8, Third Office Action dated Nov. 12, 2013, all pages.
Chinese Patent Application No. 200880122424.8, Fourth Office Action dated Jun. 19, 2014, all pages.

* cited by examiner

TRANSMITTER FOR TRANSMITTING A SECURE ACCESS SIGNAL

CROSS-REFERENCE TO RELATED APPLICATIONS

This application is a continuation application of U.S. patent application Ser. No. 15/213,661, filed Jul. 19, 2016, which is a continuation application of U.S. patent application Ser. No. 14/308,091, filed Jun. 18, 2014, which is a continuation application of U.S. patent application Ser. No. 12/738,663, filed Apr. 22, 2010, which is a national stage entry of PCT/AU2008/001490, filed Oct. 8, 2008, which claims priority to AU2007905760, filed Oct. 22, 2017, and also claims priority to AU2008900672, filed Feb. 13, 2008, all of which are hereby incorporated by reference in their entireties.

FIELD OF THE INVENTION

The present invention relates to secure access systems and, in particular, to systems for remote entry access.

BACKGROUND

FIG. 1 shows a conventional arrangement for providing secure access. A user 401 makes a request, as depicted by an arrow 402, directed to a code entry module 403. The module 403 is typically mounted on the external jamb of a secure door. The request 402 is typically a secure code of some type which is compatible with the code entry module 403. Thus, for example, the request 402 can be a card number stored within a conventional proximity card used to direct the request 402 to a card reader 403. Alternatively, the request 402 can be a sequence of secret numbers directed to a keypad 403. The request 402 can also be a biometric signal from the user 401 directed to a corresponding biometric sensor 403. One example of a biometric signal is a fingerprint. Other physical attributes that can be used to provide biometric signals include voice, retinal or iris pattern, face pattern, palm configuration and so on.

The code entry module 403 conveys the request 402 by sending a corresponding signal, as depicted by an arrow 404, to a controller 405 which is typically situated in a remote or inaccessible place. The controller 405 authenticates the security information provided by the user 401 by interrogating a database 407 as depicted by an arrow 406. If the user 401 is authenticated, and has the appropriate access privileges, then the controller 405 sends an access signal, as depicted by an arrow 408, to a device 409 in order to provide the desired access. The device 409 can, for example, be the locking mechanism of a secure door, or can be an electronic lock on a personal computer (PC) which the user 401 desires to access.

Current systems as depicted in FIG. 1 utilise a communication protocol called "Wiegand" for communication between the code entry module 403 and the controller 405. The Wiegand protocol is a simple one-way data protocol that can be modified by increasing or decreasing the bit count to ensure uniqueness of the protocol among different security companies. The Wiegand protocol does not secure the information being sent between the code entry module 403 and the controller 405.

More advanced protocols such as RS 485 have been used in order to overcome the vulnerability of the Wiegand protocol over long distance routes. RS 485 is a duplex protocol offering encryption capabilities at both the transmitting and receiving ends, i.e. the code entry module 403 and the controller 405 respectively in the present case. The length of the path 404 nonetheless provides an attack point for the unauthorised person.

Proximity cards have become a popular means for emitting the request 402, since proximity cards are cheap, easy to use and convenient to carry for the user 401. Typically, proximity cards comprise an inductive circuit including an integrated circuit (IC), a capacitor, and a coil, which are connected in series within the card. When a proximity card 410 is placed within range of the code entry module 403 (or "card reader"), the code entry module 403 presents a field that excites the coil and charges the capacitor, which in turn energizes the IC on the proximity card 410. The IC then transmits a card number stored within the IC, via the coil as transmit antenna, to the code entry module 403. The field emitted by the code entry module 403 for older proximity cards is typically around 125 kHz. The field emitted by the code entry module 403 for newer proximity cards is typically around 13.56 MHz. These newer proximity cards are typically in the form of contactless RFID cards which are also known as "contactless smartcards". Proximity cards have a communication range of 0-80 mm in most instances, allowing the user to place the card 410 within 80 mm of the code entry module 403 in order for the card to be read by the code entry module 403. The term "communication range" refers, in the described example, to the distance to within which the proximity module 126 and the code entry module 130 must be brought in order for their respective transmit/receive antennas to be able to achieve satisfactory communications.

Conventional proximity cards (e.g., 410) used for emitting the request 402 may be lost by the user 401, and the lost proximity card 410 may be used by an unauthorised person to gain the desired access. In fact, there has been a high incidence of such fraudulent activity with conventional proximity cards where unauthorised persons steal the cards. As a result many users have looked to upgrade their proximity card secure access systems with other more secure systems. However, the cost of such up-grades is high due to the necessity to re-wire buildings and facilities to implement the upgrades.

SUMMARY

It is an object of the present invention to substantially overcome, or at least ameliorate, one or more disadvantages of existing arrangements.

According to a first aspect of the present invention there is provided a transmitter for transmitting a secure access signal to a system for providing secure access to a controlled item, said access being dependent on information contained in the secure access signal, the transmitter comprising:

a biometric sensor for receiving a biometric signal;

a processor for matching the biometric signal against members of a database of biometric signatures; and enabling means for enabling an inductive circuit, based on the matching of the biometric signal, to transmit the secure access signal conveying the information to the system upon the inductive circuit being placed within range of a radio frequency field emitted by the system.

According to another aspect of the present invention there is provided a method of transmitting a secure access signal to a system for providing secure access to a controlled item, said access being dependent on information contained in the secure access signal, the method comprising:

receiving a biometric signal;
matching the biometric signal against members of a database of biometric signatures; and
enabling an inductive circuit, based on the matching of the biometric signal, to transmit the secure access signal conveying the information to the system upon the inductive circuit being placed within range of a radio frequency field emitted by the system.

According to still another aspect of the present invention there is provided a computer program product having a computer readable medium having a computer program recorded therein for transmitting a secure access signal to a system for providing secure access to a controlled item, said access being dependent on information contained in the secure access signal, the program comprising:
  code for receiving a biometric signal;
  code for matching the biometric signal against members of a database of biometric signatures; and
  code for enabling an inductive circuit, based on the matching of the biometric signal, to transmit the secure access signal conveying the information to the system upon the inductive circuit being placed within range of a radio frequency field emitted by the system.

According to still another aspect of the present invention there is provided a system for providing secure access to a controlled item, the system comprising:
  a database of biometric signatures;
  a transmitter sub-system comprising:
    a biometric sensor for receiving a biometric signal;
    means for matching the biometric signal against members of the database of biometric signatures; and
    means for enabling an inductive circuit, based on the matching of the biometric signal, to transmit a secure access signal conveying information upon the inductive circuit being placed within range of a radio frequency field; and
  a receiver sub-system comprising;
    means for emitting the radio frequency field;
    means for receiving the transmitted secure access signal upon the radio frequency field being emitted; and
    means for providing conditional access to the controlled item dependent upon said information.

According to still another aspect of the present invention there is provided a transmitter sub-system for operating in a system for providing secure access to a controlled item, the system comprising a database of biometric signatures, a receiver sub-system comprising means for emitting a radio frequency field, means for receiving a secure access signal transmitted by the transmitter sub-system, and means for providing conditional access to the controlled item dependent upon information conveyed in the secure access signal; wherein the transmitter sub-system comprises:
  a biometric sensor for receiving a biometric signal;
  means for matching the biometric signal against members of the database of biometric signatures; and
  means for enabling an inductive circuit, based on the matching of the biometric signal, to transmit a secure access signal conveying said information upon the inductive circuit being placed within range of the radio frequency field.

According to still another aspect of the present invention there is provided a receiver sub-system for operating in a system for providing secure access to a controlled item, the system comprising a database of biometric signatures, a transmitter sub-system comprising a biometric sensor for receiving a biometric signal, means for matching the biometric signal against members of the database of biometric signatures, and means for enabling an inductive circuit, based on the matching of the biometric signal, to transmit a secure access signal conveying information; wherein the receiver sub-system comprises:
  means for emitting a radio frequency field;
  means for receiving the transmitted secure access signal from the transmitter sub-system upon the inductive circuit being placed within range of a radio frequency field; and
  means for providing conditional access to the controlled item dependent upon said information.

According to still another aspect of the present invention there is provided a system for providing secure access to one of a plurality of controlled items, the system comprising:
  a database of biometric signatures;
  a transmitter sub-system comprising:
    a biometric sensor for receiving a biometric signal;
    means for determining if the received biometric signal matches a member of the database of biometric signatures;
    a plurality of proximity modules associated with the plurality of controlled items;
    means for selecting one of said plurality of proximity modules; and
    means for enabling, if the received biometric signal matches a member of the database of biometric signatures, the selected proximity module which can consequently transmit a secure access signal conveying information stored in the selected proximity module upon the proximity module being placed within range of a radio-frequency field adapted to activate the selected proximity module; and
  a receiver sub-system comprising;
    means for emitting said radio frequency field adapted to activate the selected proximity module;
    means for receiving the transmitted secure access signal upon the radio frequency field being emitted; and
    means for providing conditional access to the selected controlled item dependent upon said information.

According to still another aspect of the present invention there is provided a transmitter for transmitting a secure access signal to a system for providing secure access to one of a plurality of controlled items, said access being dependent on information contained in the secure access signal, the transmitter comprising:
  a biometric sensor for receiving a biometric signal;
  means for determining if the received biometric signal matches a member of a database of biometric signatures;
  a plurality of proximity modules associated with the plurality of controlled items;
  means for selecting one of said plurality of proximity modules; and
  means for enabling, if the received biometric signal matches a member of the database of biometric signatures, the selected proximity module which can consequently transmit a secure access signal conveying information stored in the selected proximity module upon the proximity module being placed within range of a radio-frequency field adapted to activate the selected proximity module.

According to still another aspect of the present invention there is provided a receiver sub-system in a system for providing secure access to one of a plurality of controlled items, the system comprising a database of biometric signatures, a transmitter sub-system comprising a biometric sensor for receiving a biometric signal, means for determining if the received biometric signal matches a member of the database of biometric signatures, a plurality of proximity modules associated with the plurality of controlled items, means for selecting one of said plurality of proximity modules, and means for enabling, if the received biometric signal matches a member of the database of biometric signatures, the selected proximity module which can consequently transmit a secure access signal conveying information stored in the selected proximity module upon the proximity module being placed within range of a radio-frequency field adapted to activate the selected proximity module; said receiver sub-system comprising:

means for emitting said radio frequency field adapted to activate the selected proximity module;

means for receiving the transmitted secure access signal upon the radio frequency field being emitted; and means for providing conditional access to the selected controlled item dependent upon said information.

According to still another aspect of the present invention there is provided a system for performing a secure transaction, the system comprising:

a database of one or more biometric signatures;

a first subsystem comprising:

a biometric sensor for receiving a biometric signal;

means for matching the biometric signal against members of the database of biometric signatures to thereby determine an authentication signal; and means for generating a first password dependent upon said authentication signal, said password being generated according to an encryption process based on a dynamic input value, said first password comprising an encrypted value representing funds available; and a second sub-system comprising:

means for receiving the first password;

means for determining the funds available based on the received password; and means for performing the transaction based on the available funds.

According to still another aspect of the present invention there is provided a first sub-system for operating in a system for performing a secure transaction, the system comprising a database of biometric signatures, a second sub-system comprising means for receiving a password, and means for performing the secure transaction based on available funds dependent upon the password, the first subsystem comprising:

a biometric sensor for receiving a biometric signal;

means for matching the biometric signal against members of the database of biometric signatures to thereby determine an authentication signal; and means for generating the password dependent upon said authentication signal, wherein said password is generated according to an encryption process based on a dynamic input value, said first password comprising an encrypted value representing said funds available.

According to still another aspect of the present invention there is provided a system for performing a secure transaction over a network using a card, the system comprising:

a database of one or more biometric signatures;

a first subsystem comprising:

a biometric sensor for receiving a biometric signal;

means for matching the biometric signal against members of the database of biometric signatures to thereby determine an authentication signal; and means for generating a password dependent upon said authentication signal, said password being generated according to an encryption process based on a dynamic input value, said first password comprising an encrypted value representing said magnetic stripe card; and a second sub-system comprising:

means for reading the card;

means for receiving the password;

means for authenticating the received password based on the card number encrypted within password; and means for performing the transaction based on the authentication.

According to still another aspect of the present invention there is provided a method of transmitting a secure access signal to a system for providing secure access to one of a plurality of controlled items, said access being dependent on information contained in the secure access signal, the method comprising the steps of:

receiving a biometric signal;

matching the biometric signal to a member of a database of biometric signatures;

selecting one of a plurality of proximity modules, the selected proximity module being associated with at least one of the plurality of controlled items; and enabling the selected proximity module, if the received biometric signal matches a member of the database of biometric signatures, the enabled selected proximity module being configured for transmitting a secure access signal conveying information stored in the selected proximity module upon the proximity module being placed within range of a radio-frequency field adapted to activate the selected proximity module.

According to still another aspect of the present invention there is provided a method for performing a secure transaction over a network using a card, the method comprising:

matching a biometric signal against members of a database of biometric signatures to thereby determine an authentication signal; and generating a password dependent upon said authentication signal, said password being generated according to an encryption process based on a dynamic input value, said password comprising an encrypted number representing said card;

reading the card to determine said card number from said card;

authenticating a received password based on the card number, encrypted within password; and performing the transaction based on the authentication.

According to still another aspect of the present invention there is provided a computer program product having a computer readable medium having a computer program recorded therein for transmitting a secure access signal to a system for providing secure access to a controlled item, said access being dependent on information contained in the secure access signal, the program comprising:

code for receiving a biometric signal;

code for matching the biometric signal to a member of a database of biometric signatures;

code for selecting one of a plurality of proximity modules, the selected proximity module being associated with at least one of the plurality of controlled items; and code for enabling the selected proximity module, if the received biometric signal matches a member of the database of biometric signatures, the enabled selected proximity module being configured for transmitting a secure access signal conveying information stored in the selected proximity module upon the proximity module being placed within range of a radio-frequency field adapted to activate the selected proximity module.

According to still another aspect of the present invention there is provided a computer program product having a computer readable medium having a computer program recorded therein for performing a secure transaction over a network using a card, the program comprising:

code for matching a biometric signal against members of a database of biometric signatures to thereby determine an authentication signal; and code for generating a password dependent upon said authentication signal, said password being generated according to an encryption process based on a dynamic input value, said password comprising an encrypted number representing said card;

code for reading the card to determine the card number from said card;

code authenticating a received password based on the card number encrypted within password; and code for performing the transaction based on the authentication.

Other aspects of the invention are also disclosed.

BRIEF DESCRIPTION OF THE DRAWINGS

Some aspects of the prior art and one or more embodiments of the present invention are described with reference to the drawings, in which.

DETAILED DESCRIPTION INCLUDING BEST MODE

Figure 1:
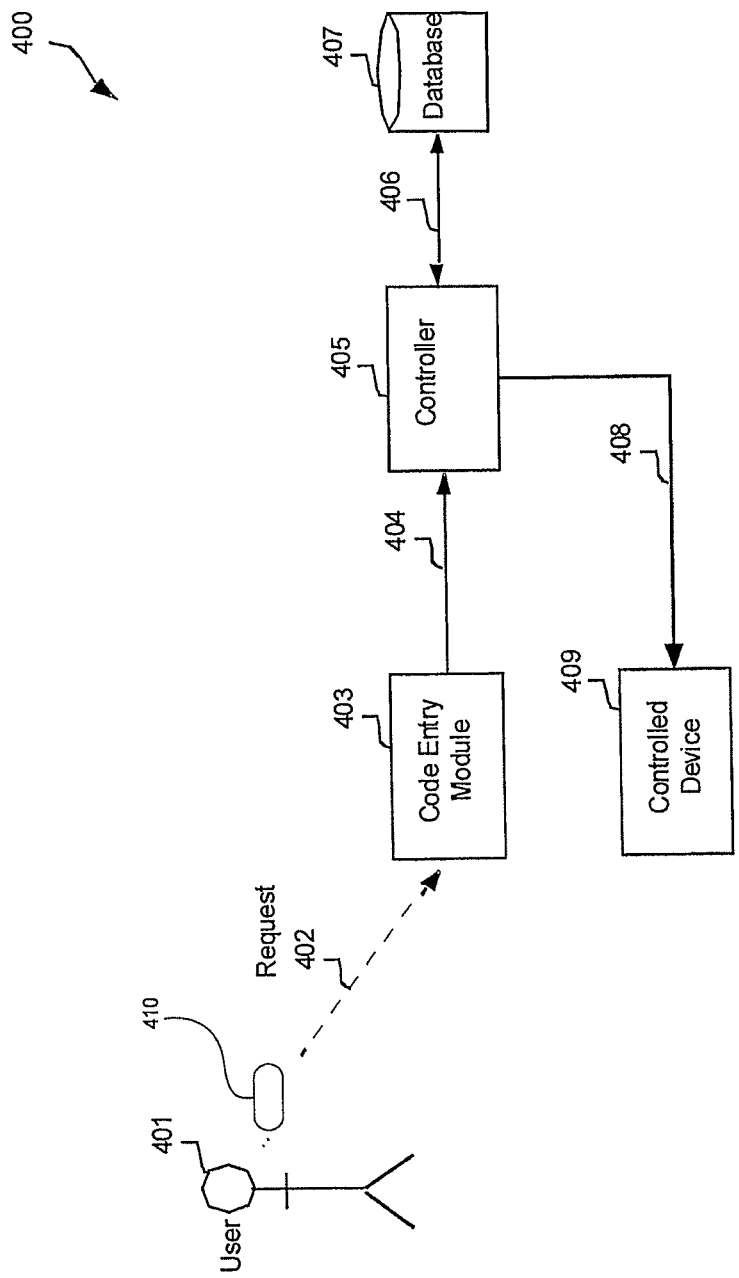
FIG. 1 shows a conventional arrangement for providing secure access.

It is to be noted that the discussions contained in the "Background" section relating to prior art arrangements relate to discussions of documents or devices which form public knowledge through their respective publication and/or use. Such should not be interpreted as a representation by the present inventor(s) or patent applicant that such documents or devices in any way form part of the common general knowledge in the art.

Where reference is made in any one or more of the accompanying drawings to steps and/or features, which have the same reference numerals, those steps and/or features have for the purposes of this description the same function(s) or operation(s), unless the contrary intention appears.

Figure 2:
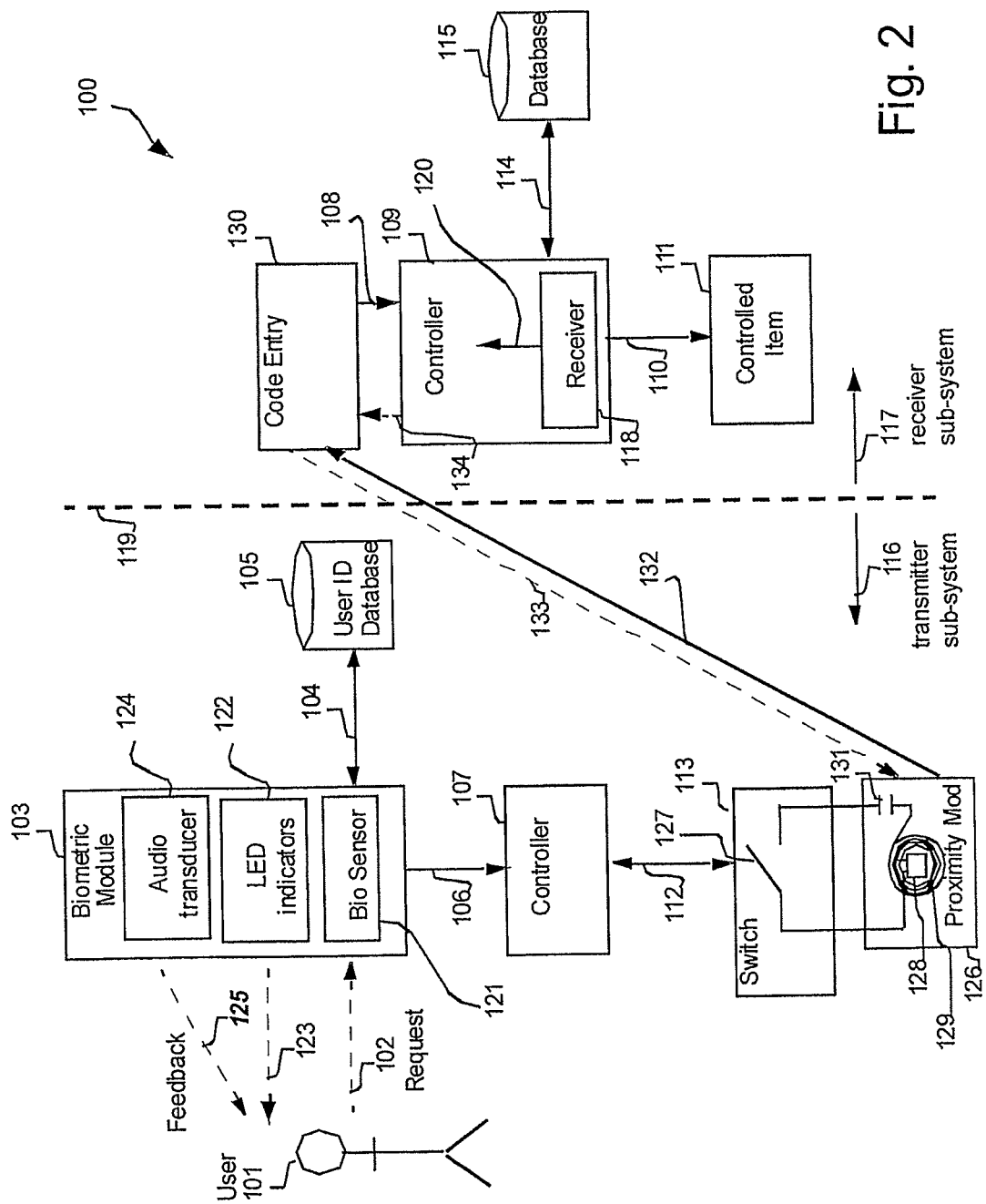
FIG. 2 is a functional block diagram of a system for providing secure access according to an exemplary embodiment of the present invention.

FIG. 2 is a functional block diagram of a system 100 for providing secure access according to the exemplary embodiment. A user 101 makes a request, as depicted by an arrow 102, to a biometric module 103. The biometric module 103 includes a biometric sensor 121 and the request 102 takes the form of a biometric signal which corresponds to the nature of the sensor 121 in the module 103. In the embodiments described herein, the biometric sensor 121 in the module 103 is a fingerprint sensor and the request 102 typically takes the form of a thumb press on a sensor panel (not shown) on the module 103. Alternatively, the biometric sensor 121 may be responsive to one or more of voice, retinal pattern, iris pattern, face pattern and palm configuration.

The module 103 interrogates, as depicted by an arrow 104, a user identity database 105. Thus for example if the request 102 is the thumb press on the biometric sensor panel 121 then the user database 105 contains one or more members in the form of biometric signatures for authorised users against which the request 102 can be authenticated. If the identity of the user 101 is authenticated successfully, then the biometric module 103 sends a signal 106 to a controller 107. Upon receiving the signal 106, the controller 107 sends a signal, as depicted by an arrow 112, to a switch module 113 comprising a "normally open" switch 127. Any suitable mechanical or electronic (e.g., semiconductor) switch may be used to implement the switch 127.

As seen in FIG. 2, the switch module 113 is connected to a proximity module 126. The proximity module 126 comprises an inductive circuit formed from an IC 128, a coil 129 and a capacitor 131, which are connected in series. The IC 128 has information in the form of a unique card number stored within a memory of the IC 128. The switch 127 of the switch module 113 is connected in series with the IC 128, the coil 129 and the capacitor 131 of the proximity module 126. Accordingly, the proximity module 126 is similar to that used in conventional proximity cards such as those provided by financial institutions such as VISA®, MASTERCARD®, AMERICAN EXPRESS® and so on. However, the switch module 113 is configured to close and open the circuit formed by the IC 128, the coil 129 and the capacitor 131, thereby enabling and disabling the proximity module 126, respectively.

Upon receiving the signal 112 from the controller 107, the switch module 113 closes the normally open switch 127 for a predetermined period of time (e.g., four to five seconds). Within this period the inductive circuit in the proximity card module 126 is enabled and may be placed by the user 101 within range of a radio frequency field being emitted by a code entry module 130. The field emitted by the code entry module 130 excites the coil 129 and charges the capacitor 131, which in turn energizes the IC 128 and thus activates the proximity module 126. The IC 128 then transmits, as depicted by an arrow 132, a secure access signal, via the coil as transmit antenna, to the code entry module 130. Accordingly, the secure access signal 132 is transmitted via the inductive circuit. The secure access signal 132 is configured for conveying information including the card number stored within the memory of the IC 128.

The switch 127 is preferably implemented in the form of a flip/flop arrangement where upon receiving the signal 112 the switch 127 will close but will automatically return to the normally open position at the end of the predetermined period. Accordingly, if the proximity card module 126 is not placed within the range of the code entry module 130 within the predetermined period, then the field emitted by the code entry module 130 will not charge the capacitor 131 as the switch 127 has opened the circuit formed by the IC 128, coil 129 and capacitor 131. In this instance, the user 101 again makes the request 102 in order to enable the proximity module 126.

Upon receiving the secure access signal 132 including the card number from the proximity card module 126, the code entry module 130 sends a signal, as depicted by an arrow 108, including the card number to a controller 109. The controller 109 tests the card number received from the code entry module 130 against a database 115 of card numbers, this testing being depicted by an arrow 114. If the incoming card number received from the code entry module 130 is found to be legitimate, then the controller 109 sends a command, as depicted by an arrow 110, to a controlled item 111. The controlled item 111 can be a door locking mechanism on a secure door, or an electronic lock (or key circuit) on a personal computer (PC) that is to be accessed by the user 101. Accordingly, access to the controlled item 111 is dependent on the information (e.g., the card number) contained in the secure access signal 132. The system 100 provides conditional access to the controlled item 111 dependent upon the information contained in the secure access signal 132.

It is noted that the controller 109 contains a receiver 118 that receives the signal 108 including the card number and converts the signal 108 into a form, as depicted by an arrow 120, that the controller 109 can use.

The biometric module 103 also incorporates at least one mechanism for providing feedback to the user 101. This mechanism can, for example, take the form of one or more Light Emitting Diodes (LEDs) 122 which can provide visual feedback, depicted by an arrow 123 to the user 101. Alternately, or in addition, the mechanism can take the form of an audio signal provided by an audio transducer 124 providing audio feedback 125. Similarly, the code entry module 130 may also incorporate one or more mechanisms for providing feedback to the user 101.

The transmitter sub-system (or transmitter) in FIG. 2 falling to the left hand side, as depicted by an arrow 116, of a dashed line 119 may be implemented in a number of different forms. The transmitter sub-system 116 (or transmitter), including the biometric module 103, the switch module 113, the user ID database 105, the controller 107 and the proximity module 126, may for example be incorporated within a remote fob (which is a small portable device carried by the user 101) or even a mobile (cell) telephone. The biometric module 103 may be powered by an internal battery of the fob or telephone.

Similar to the transmitter sub-system 116, the code entry module 130, the controller 109, database 115 and the controlled item 111 form a receiver sub-system 117 as seen in FIG. 2.

The code entry module 130 may be mounted in a protected enclosure on the outside jamb of a secured door. In this instance, the channel used by the signal 108 typically uses a wired medium. However, the code entry module 130 may communicate with the controller 109 via a wireless communication channel used by the signal 108.

The controller 109, database 115 and controlled item 111 are typically located in an inaccessible area such as a hidden roof space or alternately in a suitable protected area such as an armoured cupboard. In the case that a wireless communication channel is used by the signal 108, the location of the controller 109 is of course consistent with reliable reception of the wireless signal 108.

In the case that the code entry module 130 communicates with the controller 109 via a wireless communication channel, the signal 108 may be based upon rolling code. However, it is noted that this is merely one arrangement, and other secure codes can equally be used. Thus, for example, either of the Bluetooth™ protocol, or the Wi Fi™ protocols may be used.

Rolling codes provide a substantially non-replayable non-repeatable and encrypted radio frequency data communications scheme for secure messaging. These codes use inherently secure protocols and serial number ciphering techniques which may be used to hide clear text values required for authentication.

Rolling codes may use a different code variant each time the transmission of the signal 108 occurs. This is achieved by encrypting the data from the code entry module 130 with a mathematical algorithm, and ensuring that successive transmissions of the signal 108 are modified using a code and/or a look-up table known to both the code entry module 130 and the receiver sub-system 117. Using this approach, successive transmissions are modified, resulting in a non-repeatable data transfer, even if the information from the code entry module 130 remains the same. The modification of the code in the signal 108 for each transmission significantly reduces the likelihood that an intruder can access the information and replay the information to thereby gain entry at some later time.

The biometric signature database 105 is shown in FIG. 2 to be part of the transmitter sub-system 116. The sub-system 116 may comprise a memory 1006 (see FIG. 6) containing the database 105 of biometric signatures. As described above, the transmitter sub-system 116 including the database 105 may be implemented as a remote fob, where the fob incorporates the biometric (e.g. fingerprint) authentication arrangement. However, in an alternate arrangement, the biometric signature database 105 can be located in the receiver sub-system 117 together with the controller 109, in which case the communication 104 between the biometric module 103 and the signature database 105 can also be performed over a secure wireless communication channel. In the event that the secure access system 100 is being applied to providing secure access to a PC, then the secured PC can store the biometric signature of the authorised user in internal memory, and the PC can be integrated into the sub-system 117 of FIG. 1.

The combination of the biometric verification and proximity module 126 in a remote fob provides a particularly significant advantage over current proximity card systems. If the remote fob is lost by the user 101, the lost remote fob may not be used by an unauthorised person to gain the desired access. Further, the security of conventional proximity card systems may be improved without the need to upgrade existing infrastructure.

Figure 3:
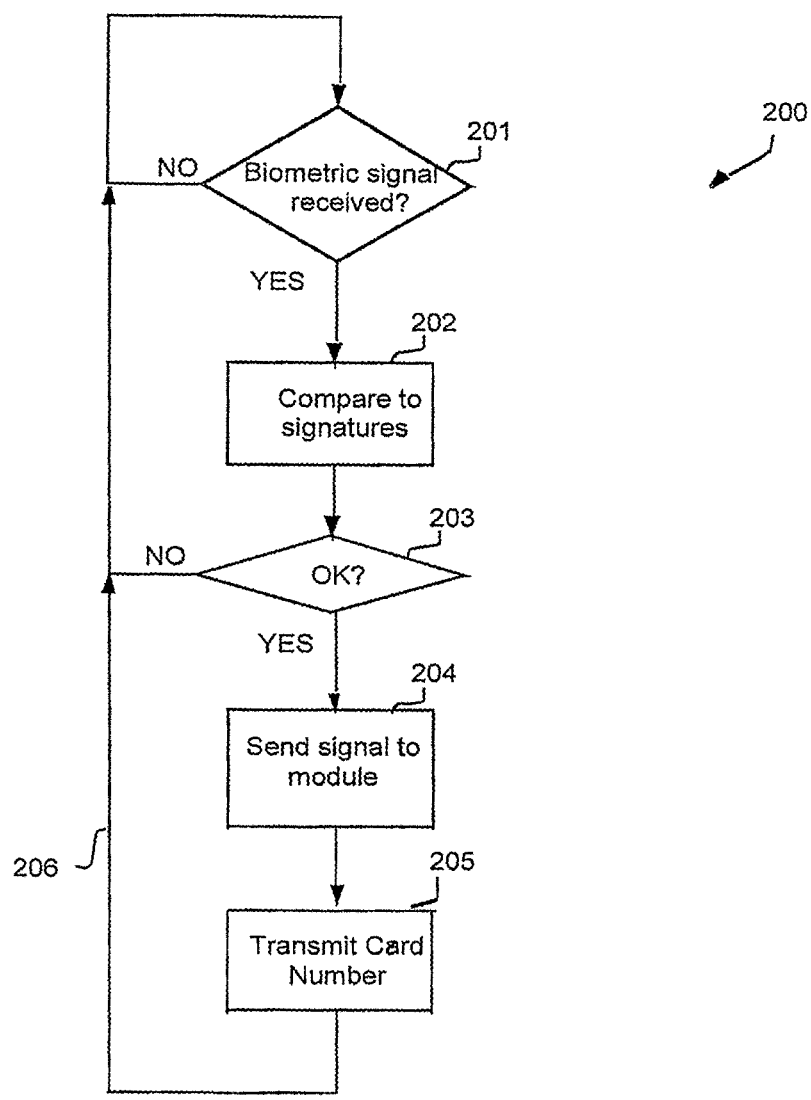
FIG. 3 shows an example of a method of operation of a transmitter sub-system of the system of FIG. 2.

FIG. 3 shows the method 200 of operation of the transmitter sub-system 116 of FIG. 2. The method 200 commences with a testing step 201 in which the biometric sensor 121 in the code entry module 103 checks whether a biometric signal 102 is being received. If this is not the case, then the method 200 is directed in accordance with a NO arrow back to the step 201 in a loop. If, on the other hand, the biometric signal 102 has been received, then the method 200 is directed in accordance with a YES arrow to a step 202. The step 202 compares the received biometric signal 102 with information in the biometric signature database 105 in order to ensure that the biometric signal received 102 is that of the rightful user 101 of the transmitter sub-system 116.

A subsequent testing step 203 checks whether the comparison in the step 202 yields the desired authentication. If the biometric signature matching is authenticated, then the method 200 is directed in accordance with a YES arrow to a step 204. In the step 204 the controller 107 sends the signal 112 to the switch module 113 to close the normally open switch 127 to allow the coil 129 to be excited when the proximity card module 126 is placed within range of the code entry module 130. Then at the next step 205, upon the proximity card module 126 being placed within the field of the code entry module 130, the coil 129 is excited and charges the capacitor 131, which in turn energizes the IC 128. The IC 128 then transmits, as depicted by an arrow 132, the card number stored within the IC 128, via the coil, to the code entry module 130. The method 200 is then directed in accordance with an arrow 206 back to the step 201.

Returning to the testing step 203, if the signature comparison indicates that the biometric signal 102 is not authentic, and has thus not been received from the proper user, then the method 200 is directed in accordance with a NO arrow back to the step 201. In an alternate arrangement, the NO arrow from the step 203 could lead to a disabling step which would disable further operation of the transmitter sub-system 116, either immediately upon receipt of the incorrect biometric signal 102, or after a number of attempts to provide the correct biometric signal 102.

Figure 4:
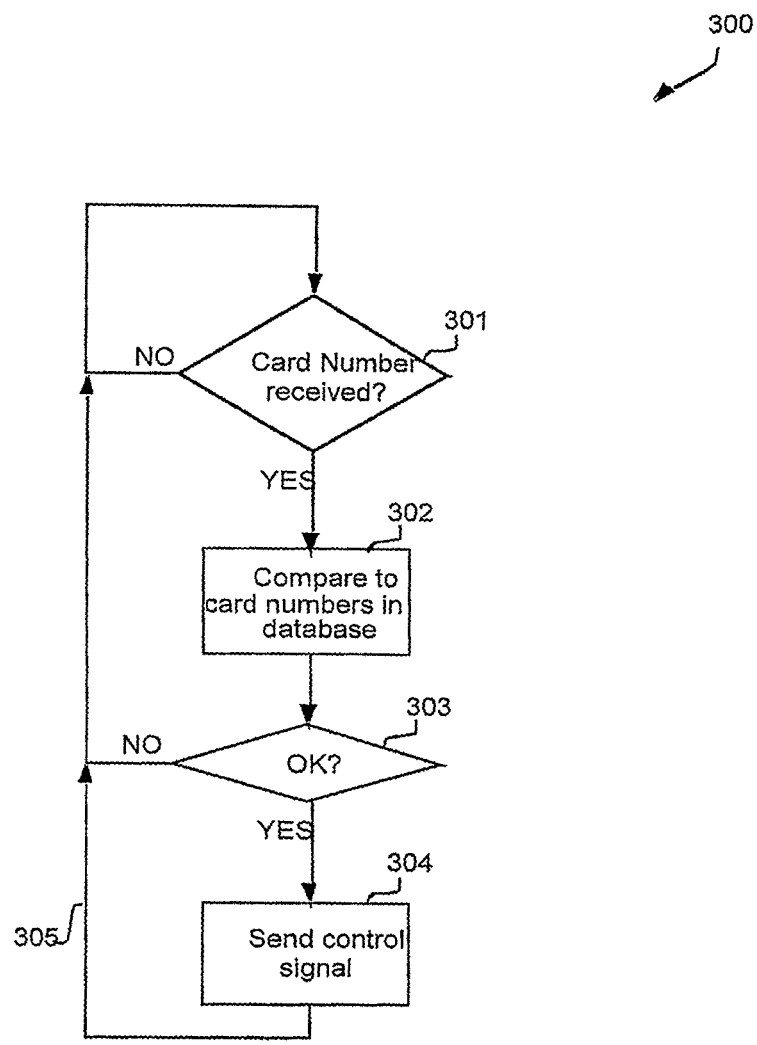
FIG. 4 shows an example of a method of operation of a receiver sub-system of the system of FIG. 2.

FIG. 4 shows the method of operation of the receiver sub-system 117 of FIG. 2. The method 300 commences with a testing step 301 which continuously checks whether the signal 108 including the card number has been received from code entry module 130. The step 301 is performed by the controller 109. As long as the signal 108 is not received the method 300 is directed in accordance with a NO arrow in a looping manner back to the step 301. When the signal 108 is received, the method 300 is directed from the step 301 by means of a YES arrow to a step 302. In the step 302, the controller 109 compares the card number received by means of the signal 108 with one or more card numbers stored in the database 115. A subsequent testing step 303 is performed by the controller 109. In the step 303 if the card number received on the signal 108 is successfully matched against a card number stored in the database 115 then the method 300 is directed in accordance with a YES arrow to a step 304.

In the step 304 the controller 109 sends the control signal 110 to the controlled item 111 (for example opening the secured door). The method 300 is then directed from the step 304 as depicted by an arrow 305 back to the step 301.

Returning to the testing step 303 if the card number received on the signal 108 is not successfully matched against card number stored in the database 115 by the controller 109 then the method 300 is directed from the step 303 in accordance with a NO arrow back to the step 301. As was described in regard to FIG. 3, in an alternate arrangement, the method 300 could be directed, if the card number match is negative, from the step 303 to a disabling step which would disable the receiver sub-system 117 if the incorrect card number where received once or a number of times.

In the exemplary embodiment described above, the IC 128 merely stores information in the form of a unique card number. In an alternative embodiment, the IC 128 may be a smart card chip which may be used to store one or more other values as well as the unique card number. Such an embodiment provides particular advantages where the transmitter sub-system 116 is being used to pay for a service. For example, the IC 128 may further comprise a memory (not shown) containing a "stored value" representing an amount of money where the transmitter sub-system 116 is being used for paying the fare on a bus or other form of public transport.

Figure 5A:
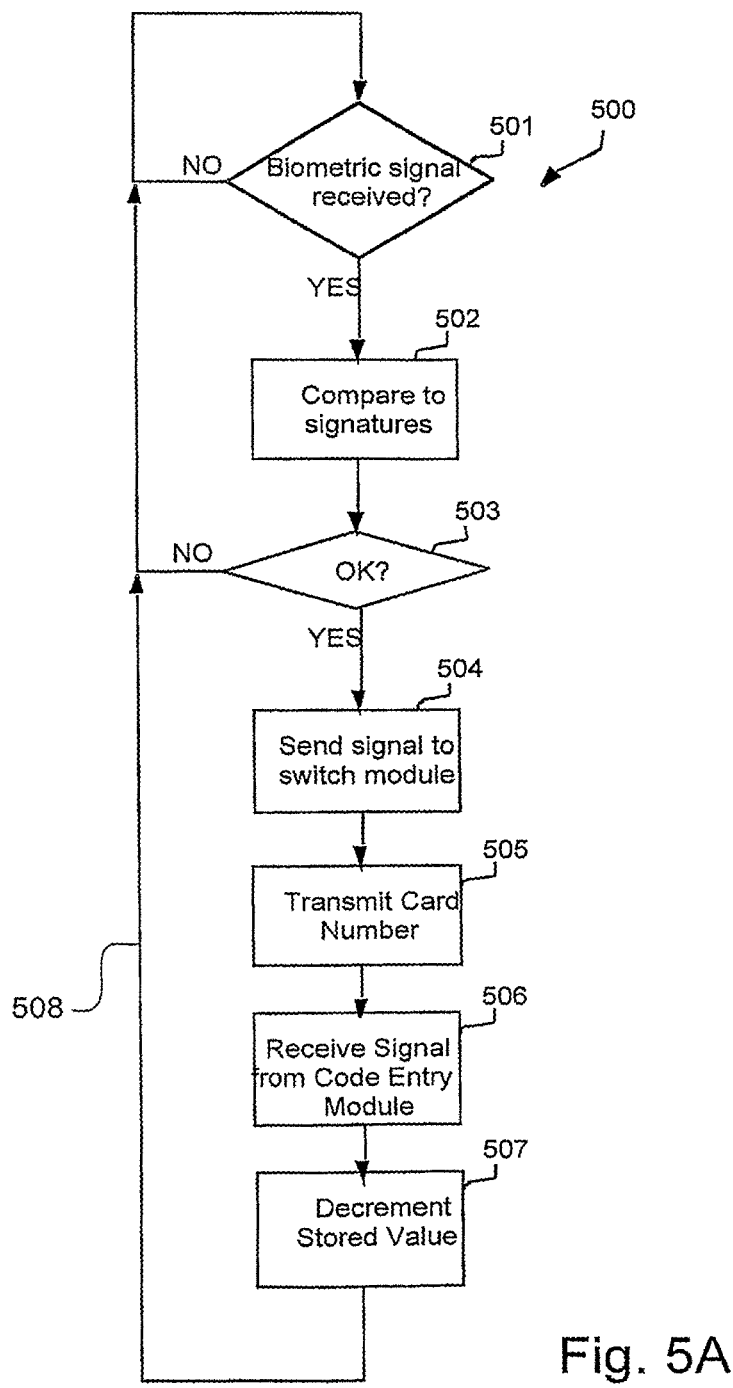
FIG. 5A shows an example of a method of operation of the transmitter sub-system of FIG. 2 where the IC is a smart card chip.

FIG. 5A shows a method 500 of operation of the transmitter sub-system 116 of FIG. 2 where the IC 128 is a smart card chip containing a stored value representing an amount of money, in accordance with the alternative embodiment. The method 500 commences with a testing step 501 in which the biometric sensor 121 in the code entry module 103 checks whether a biometric signal 102 is being received. If this is not the case, then the method 500 is directed in accordance with a NO arrow back to the step 501 in a loop. If, on the other hand, the biometric signal 102 has been received, then the method 500 is directed in accordance with a YES arrow to a step 502. The step 502 compares the received biometric signal 102 with information in the biometric signature database 105 in order to ensure that the biometric signal received 102 is that of the rightful user 101 of the transmitter sub-system 116.

A subsequent testing step 503 checks whether the comparison in the step 502 yields the desired authentication. If the biometric signature matching is authenticated, then the method 500 is directed in accordance with a YES arrow to a step 504. In the subsequent step 504 the controller 107 sends the signal 112 to the switch module 113 to close the normally open switch 127 to allow the coil 129 to be excited when the proximity module 126 is placed within range of the code entry module 130. Then at the next step 505, upon the proximity module 126 being placed within the field of the code entry module 130, the coil 129 is excited and charges the capacitor 131, which in turn energizes the IC 128. The IC 128 then transmits, as depicted by the arrow 132, the card number stored within the IC 128, via the coil, to the code entry module 130.

At the next step 506, the proximity module 126 receives a signal, as depicted by the arrow 133, from the code entry module 130. In the described arrangement, the signal 133 is received via the coil 129 acting as a receive antenna. Then at the next step 507, the IC 128 decrements the stored value by a predetermined amount. This predetermined amount may represent the fare for a trip on a bus, for example. In another alternative embodiment, the signal 133 received from the code entry module 130 may include a value indicating an amount that needs to be decremented from the stored value in step 507. In this instance, the IC 128 decrements the stored value by the amount represented by the value received from the code entry module 130. Accordingly, the stored value is decremented by an amount (i.e., either predetermined or variable) depending on the information (such as the card number) contained in the secure access signal 132 and the proximity module 126 never has to leave the user's hand. Following step 507, the method 500 is then directed in accordance with an arrow 508 back to the step 501.

Figure 5B:
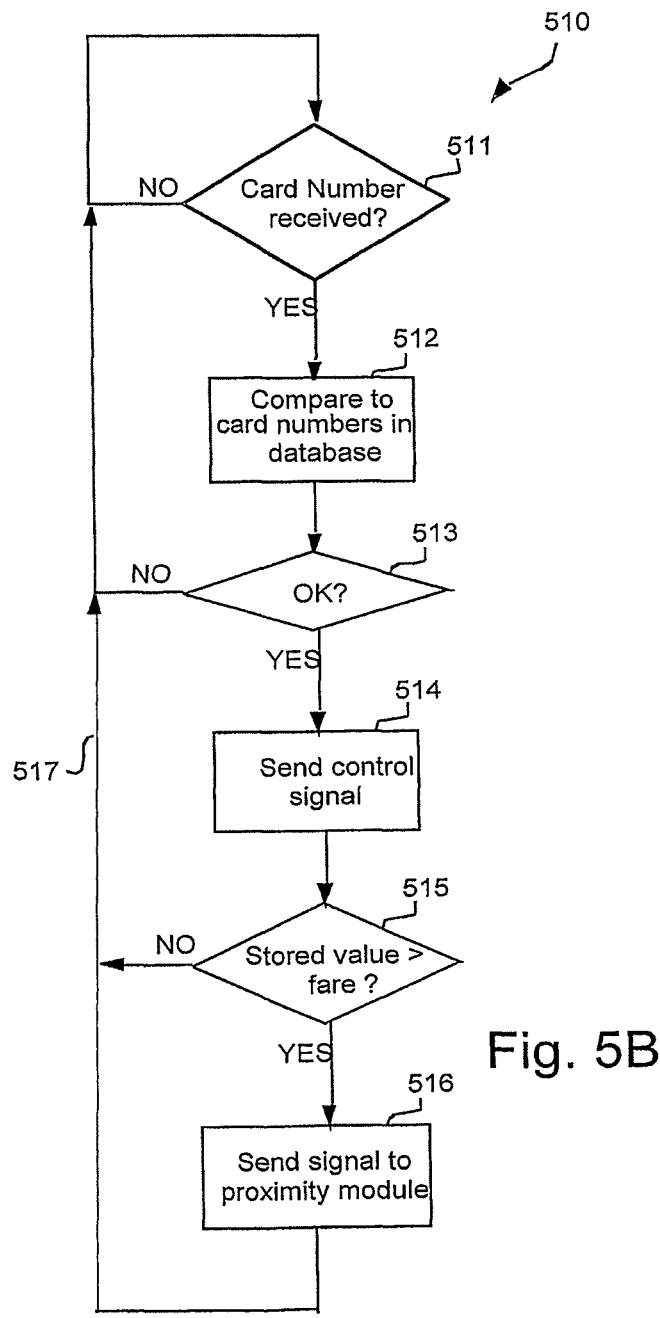
FIG. 5B shows an example of a method of operation of the receiver sub-system of FIG. 2 where the IC is a smart card chip.

FIG. 5B shows a method 510 of operation of the receiver sub-system 117 of FIG. 2 where the IC 128 is the smart card chip containing the stored value of FIG. 5A. The method 510 commences with a testing step 511 which continuously checks whether the signal 108 including the card number has been received from code entry module 130. The step 511 is performed by the controller 109. As long as the signal 108 is not received the process 510 is directed in accordance with a NO arrow in a looping manner back to the step 511. When the signal 108 is received, the method 510 is directed from the step 511 by means of a YES arrow to a step 512. In the step 512, the controller 109 compares the card number received by means of the signal 108 with the card numbers stored in the database 115. A subsequent testing step 513 is performed by the controller 109. In the step 513 if the card number received on the signal 108 is successfully matched against a card number stored in the database 115 then the method 510 is directed in accordance with a YES arrow to a step 514. In the step 514, the controller 109 sends a signal, as represented by arrow 134 of FIG. 2, to the code entry module 130 indicating that the card number was successfully matched.

In the alternative embodiment of FIG. 5A, the amount by which the stored value should be decremented (i.e., the amount of the fare) is predetermined. However, in one arrangement, the amount by which the stored value should be decremented may be variable (e.g., where the fare is variable). In this instance, the signal 134 may include a value representing the value of the fare.

At step 515, if the code entry module 130 determines that the stored value is more than the fare, then the method 510 is directed by a YES arrow to a step 516. The code entry module 130 may read a particular memory address in the IC 128 to determine if the stored value is more than the fare.

At step 516, the code entry module 130 sends the signal 133 to the proximity module 126 to indicate that the stored value should be decremented by the predetermined amount. As described above, the signal 133 may include a value indicating an amount that needs to be decremented from the stored value. At step 516, the code entry module 130 may also send a further signal to the controller 109 which in turn sends a signal 110 to the controlled item 111. In this instance, the controlled item may merely produce an audible tone indicating that the fare has been paid. Alternatively, the controlled item 111 may open a gate or enable a turnstile. The method 510 is then directed from the step 516 as depicted by an arrow 517 back to the step 511.

Returning to the testing step 513 if the card number received on the signal 108 is not successfully matched against card number stored in the database 115 by the controller 109 then the method 510 is directed from the step 513 in accordance with a NO arrow back to the step 511. In this instance, the controller 109 may send a signal 110 to the controlled item 111 which then sounds an audible alert to indicate that the fare has not been paid.

Returning to the testing step 515, if the code entry module 130 determines that the stored value is less than the fare, then the process 510 is directed from the step 515 in accordance with a NO arrow back to the step 511. Again, in this instance, the controller 109 may send a signal 110 to the controlled item 111 which then sounds an audible alert to indicate that the fare has not been paid.

In the embodiment of FIGS. 5A and 5B, the code entry module 130 may include a liquid crystal display (LCD) screen (not shown) for providing feedback to the user 101. In this instance, at step 515, the code entry module 130 may display the amount of the fare as well as the amount of the stored value representing the remaining amount of money on the proximity card module 126.

The transmitter sub-system 116 as described with reference to FIGS. 5A and 5B may also be configured to enable value to be added to the stored value. For example, a cash station similar to a train ticket vending machine may be configured with a card reader similar to the code entry module 130. In this instance, upon entering an amount of money into the vending machine (e.g., via a note collector) and providing a biometric request to the bio sensor 121, the proximity module 126 may be placed within the field of the card reader 130 of the vending machine. The card reader 130 may then send a signal to proximity module 126 indicating the value of the money entered into the vending machine and the corresponding amount by which the stored value is to be incremented.

The transmitter sub-system 116 including the switch module 113 and the proximity module 126 may also include an LCD screen (not shown) for providing feedback to the user 101. The LCD screen may be used for displaying information, such as the stored value, stored on the transmitter sub-system 116. In this instance, at step 507 of the method 500, the LCD of the transmitter sub-system 116 may display the amount of the fare as well as the amount of the stored value representing the remaining amount of money stored in the IC of the proximity module 126. In this instance, the LCD and the IC 128 included in the transmitter sub-system 116 may be powered by a battery (e.g., a battery incorporated within the remote fob). In this instance, the user 101 may determine the amount of money remaining on the transmitter sub-system 116 by presenting a biometric request. After the biometric has been authenticated in the manner described above, the amount of the stored value may be displayed on the LCD.

The IC 128 may also be used to store personal details, health records, account balances, personal identification numbers (PIN) and/or other pertinent data. Again, after a biometric has been authenticated in the manner described above, the personal details, medical records, account balances and/or PIN may be displayed on the LCD.

The IC 128 may also be used to store audit trail information so that a record is kept of the date and time that the user 101 attempted to gain access to the controlled item 111.

As will be described in detail below, the ICs such as the IC 128 may also be used to generate a one-time dynamic password for use in online banking applications or the like. If the identity of the user 101 is authenticated successfully upon the user presenting a particular biometric (e.g., an index finger), as described above, then the biometric module 103 sends the signal 106 to the controller 107. The controller 107 may then access a key stored in a key database 113 (not shown) and generate a one-time password using the key and the current time which the controller 107 determines from a clock (not shown). The password may be displayed on the LCD. The password may be generated using the RSA encryption algorithm. However, any suitable encryption algorithm may be used (e.g., Data Encryption Standard (DES), Blowfish, International Data Encryption Algorithm (IDEA)). The user may then provide the generated password read from the LCD to an authentication server via a personal computer and communications network (see FIG. 11) in order to make an online banking transaction, for example.

The transmitter sub-system 116 of any of the described embodiments may be used in automotive applications where the controlled item 111 is the central locking of a car. The controlled item 111 may also activate or deactivate an engine immobiliser.

The transmitter sub-system 116 of any of the embodiments described may also be used in resort areas, hotels, theme parks or the like. In this instance, the internal operators of the resort areas, hotels and theme parks may issue the transmitter sub-system 116 incorporated within a remote fob, for example, to the user 101. The user 101 may then operate the transmitter sub-system 116 within the confines of the resort, hotel or theme park to enter their room or to have a go on a ride, where the code entry module 130 is mounted on a door jamb or near a gate, respectively.

Any suitable and secure method may be used for populating the user ID database 105 with biometric signatures. Biometric signatures may be added to the user ID database 105 or deleted from the database 105. For example, if a biometric signal has been received by the biometric module 103 and the user ID database 105 in FIG. 2 is empty, then the received biometric may be treated as an "administrator." This would be the case, for example, if the biometric module 103 is new and has never been used, or if the user 101 has erased all the information in the database 105. The administrator may have the ability to amend data stored, for example, in the database 105. Another type of user may be termed an "ordinary user" and may not have the capability to amend the data stored in the database 105.

The first user of the biometric module 103, whether this is the user who purchases the module, or the user who programs the module 103 after all data has been erased from the database 105, may be automatically categorised as an administrator. This first administrator may direct the system 100 to either accept further administrators, or alternately to only accept further ordinary users.

Figure 6:
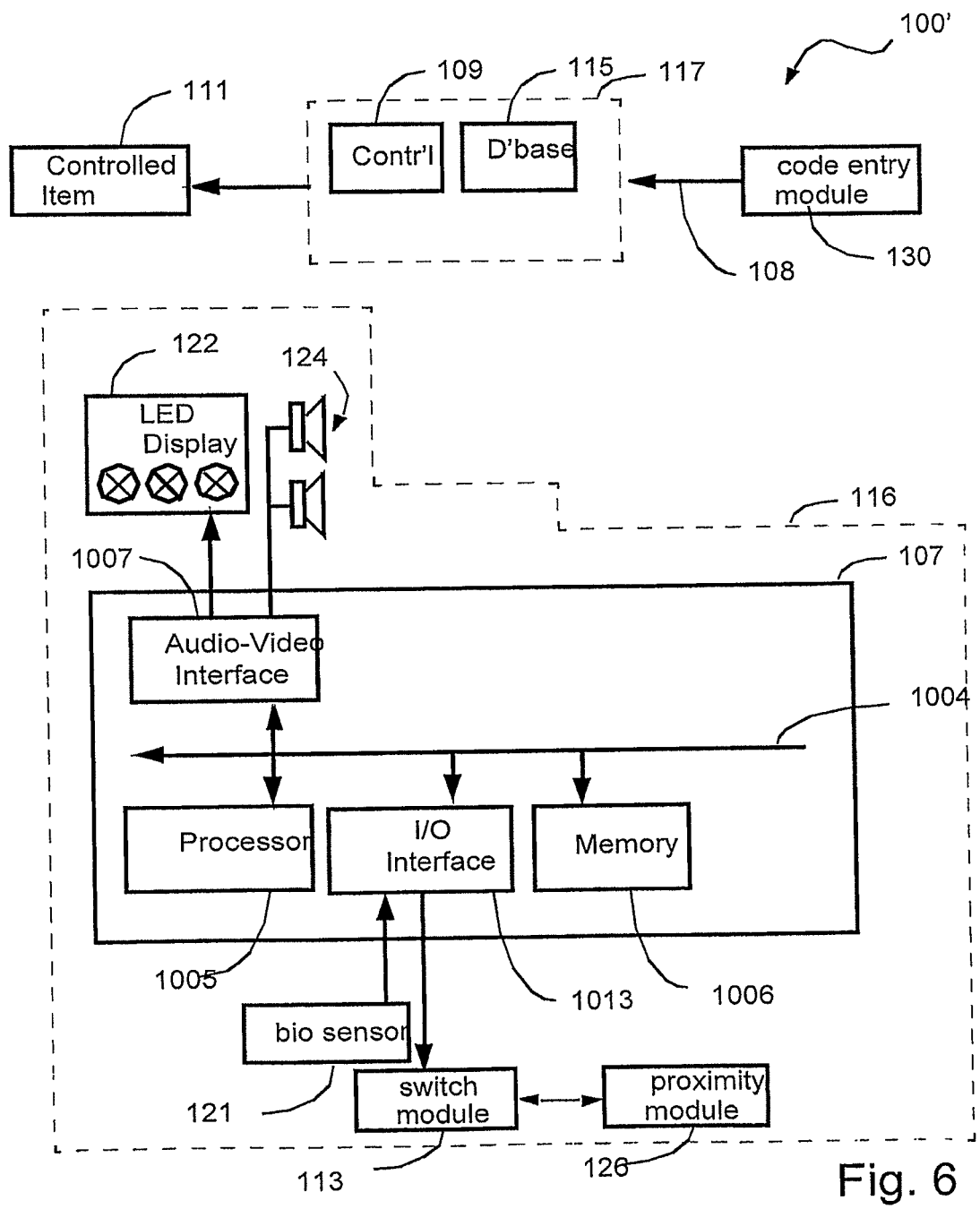
FIG. 6 is a schematic block diagram of the system in FIG. 2.

FIG. 6 is a schematic block diagram of the system 100' in FIG. 2. The disclosed secure access methods are preferably practiced using a computer system arrangement 100', such as that shown in FIG. 6 wherein the processes of FIGS. 3-5B and FIGS. 9, 12 and 14 may be implemented as software, such as application program modules executing within the computer system 100'. In particular, the method steps for providing secure access are effected by instructions in the software that are carried out under direction of the respective processor modules 107 and 109 in the sub-systems 116 and 117. The instructions may be formed as one or more code modules, each for performing one or more particular tasks. The software may also be divided into two separate parts, in which a first part performs the provision of secure access methods and a second part manages a user interface between the first part and the user. The software may be stored in a computer readable medium, including the storage devices described below, for example. The software is loaded into the sub-systems 116 and 117 from the computer readable medium, and is then executed under direction of the respective processor modules 107 and 109. A computer readable medium having such software or computer program recorded on it is a computer program product. The use of the computer program product in the computer preferably effects an advantageous apparatus for provision of secure access.

The following description is directed primarily to the transmitter sub-system 116, however the description applies in general to the operation of the receiver sub-system 117. The computer system 100' is formed, having regard to the transmitter sub-system 116, by the controller module 107, input devices such as the bio sensor 121, output devices including the LEDs 122, the audio device 124 and the switch module 113.

The controller module 107 typically includes at least one processor unit 1005, and a memory unit 1006, for example formed from semiconductor random access memory (RAM) and read only memory (ROM). The controller module 107 also includes a number of input/output (I/O) interfaces including an audio-video interface 1007 that couples to the LED display 122 and audio speaker 124, an I/O interface 1013 for the bio-sensor 121 and the switch module 113. The switch module 113 is connected to the proximity module 126.

The components 1005, 1007, 1013 and 1006 of the controller module 107 typically communicate via an interconnected bus 1004 and in a manner which results in a conventional mode of operation of the controller 107 known to those in the relevant art.

Typically, the application program modules for the transmitter sub-system 116 are resident in the memory 1006 iROM, and are read and controlled in their execution by the processor 1005. Intermediate storage of the program and any data fetched from the bio sensor 121 and a network, for example, may be accomplished using the RAM in the memory 1006. In some instances, the application program modules may be supplied to the user encoded into the ROM in the memory 1006. Still further, the software modules can also be loaded into the transmitter sub-system 116 from other computer readable media (e.g., over a communications network). The term "computer readable medium" as used herein refers to any storage or transmission medium that participates in providing instructions and/or data to the transmitter sub-system 116 for execution and/or processing. Examples of storage media include floppy disks, magnetic tape, CD-ROM, a hard disk drive, a ROM or integrated circuit, a magneto-optical disk, or a computer readable card such as a PCMCIA card and the like, whether or not such devices are internal or external of the transmitter sub-system 116. Examples of transmission media include radio or infra-red transmission channels as well as a network connection to another computer or networked device, and the Internet or Intranets including e-mail transmissions and information recorded on Websites and the like.

Figure 7A:
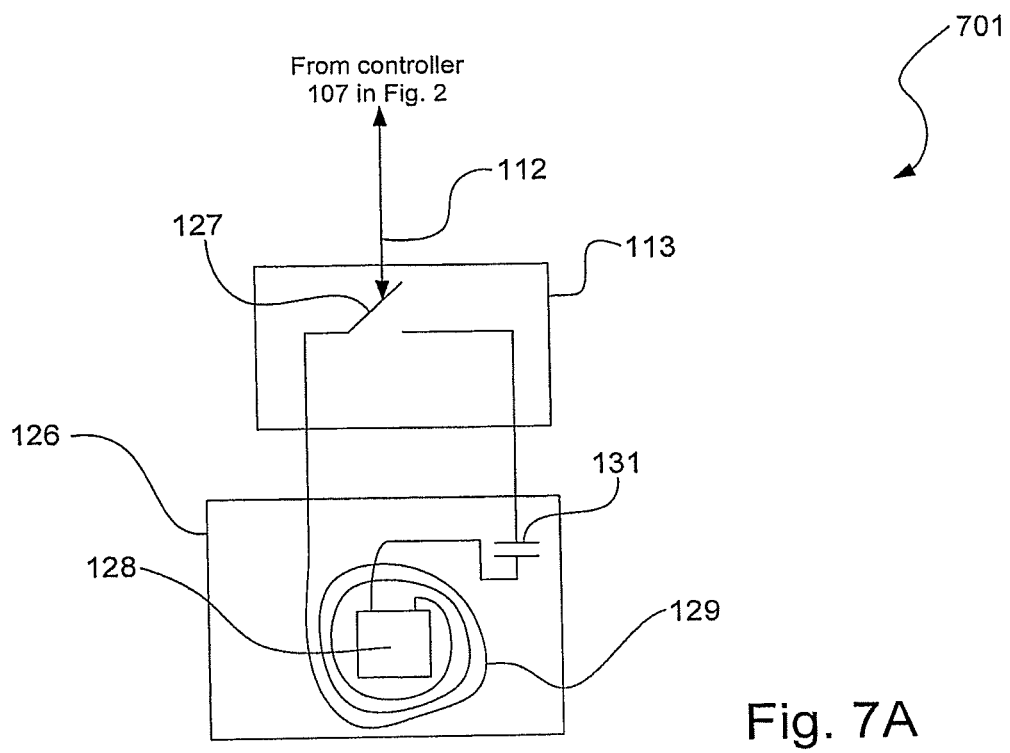
FIGS. 7A and 7B show an alternate arrangement for enabling the proximity module in FIG. 2.
Figure 7B:
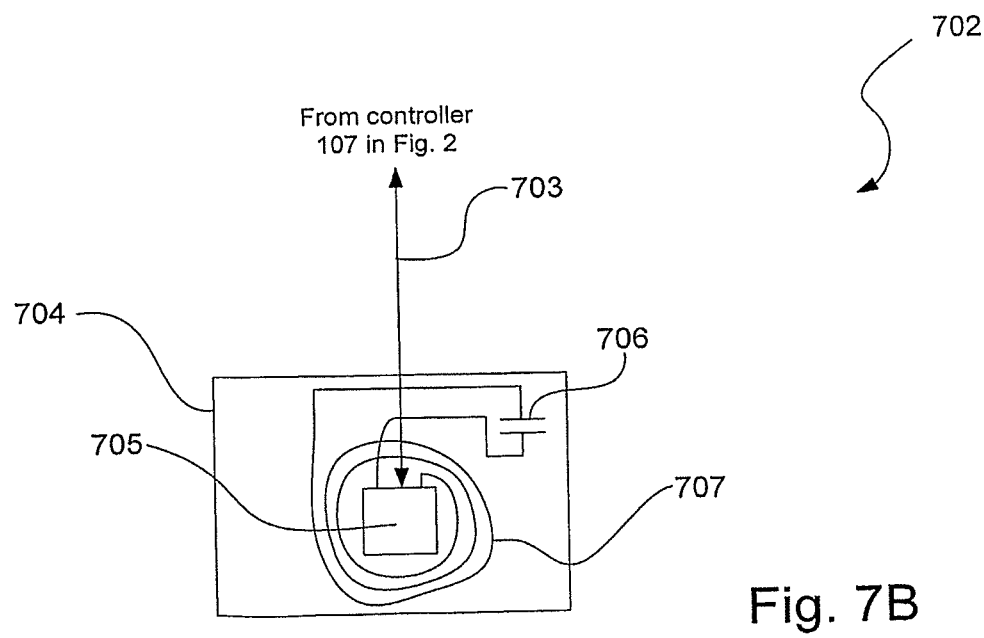

FIGS. 7A and 7B show an alternate arrangement for enabling the proximity module in FIG. 2. FIG. 7A shows the proximity arrangement of FIG. 2, in which the control signal 112 from the controller 107 of the transmitter sub-system 116 is used to control the switch module 113. When the switch 127 is open, the series circuit comprising the IC 128, the coil 129 and the capacitor 131 is open, and thus the proximity module 126 is disabled and cannot operate when it is brought into the field emitted by the code entry module 130. When the switch 127 is closed, the series circuit comprising the IC 128, the coil 129 and the capacitor 131 is closed, and thus the proximity module 126 is enabled and can perform its designated functions when brought into the field emitted by the code entry module 130. In this arrangement, the control signal 112 can be a simple binary signal, in which for example one voltage level can cause the switch 127 to be in an open state, and another voltage level can cause the switch 127 to be in an open state.

FIG. 7B shows an alternate arrangement 702 in which a proximity module 704 has a series circuit comprising an IC 705, a coil 707 and a capacitor 706 that is permanently closed, and in this arrangement, a control signal 703 controls the operation of the IC 705 directly. In this arrangement, the control signal can in one example comprise a secure encrypted communication session, using multiple layers of security if desired, between the controller 107 (see FIG. 2) and the IC 705. In another simpler arrangement, the control signal 703 can be a simple binary signal which merely enables or disables the operation of the IC 705. Upon receiving the signal 112 from the controller 107, the IC 705 remains enabled for a predetermined period of time (e.g., four to five seconds). Within this period the proximity module 704 is enabled and may be placed by the user 101 within range of a radio frequency field being emitted by a code entry module 130. Although the arrangement of FIG. 7B shows one series circuit for each IC 705, other arrangements may be used which share some of the components such as the coils and/or the capacitors.

The communication between the controller 107 and the IC 705 can be implemented using data and/or address bus communications, via a direct bus connection between the controller 107 and the IC 705. Alternatively, the communication between the controller 107 and the IC 705 can be implemented using a contactless communication interface comprising the series circuit of the IC 705, the coil 707 and the capacitor 706. The contactless communication interface between the controller 107 and the IC 705 is a software interface. Any suitable contactless communication interface may be used. In one example, the controller 107 may communicate with the IC 705 according to the Sliding Window Protocol (SWP).

Figure 8:
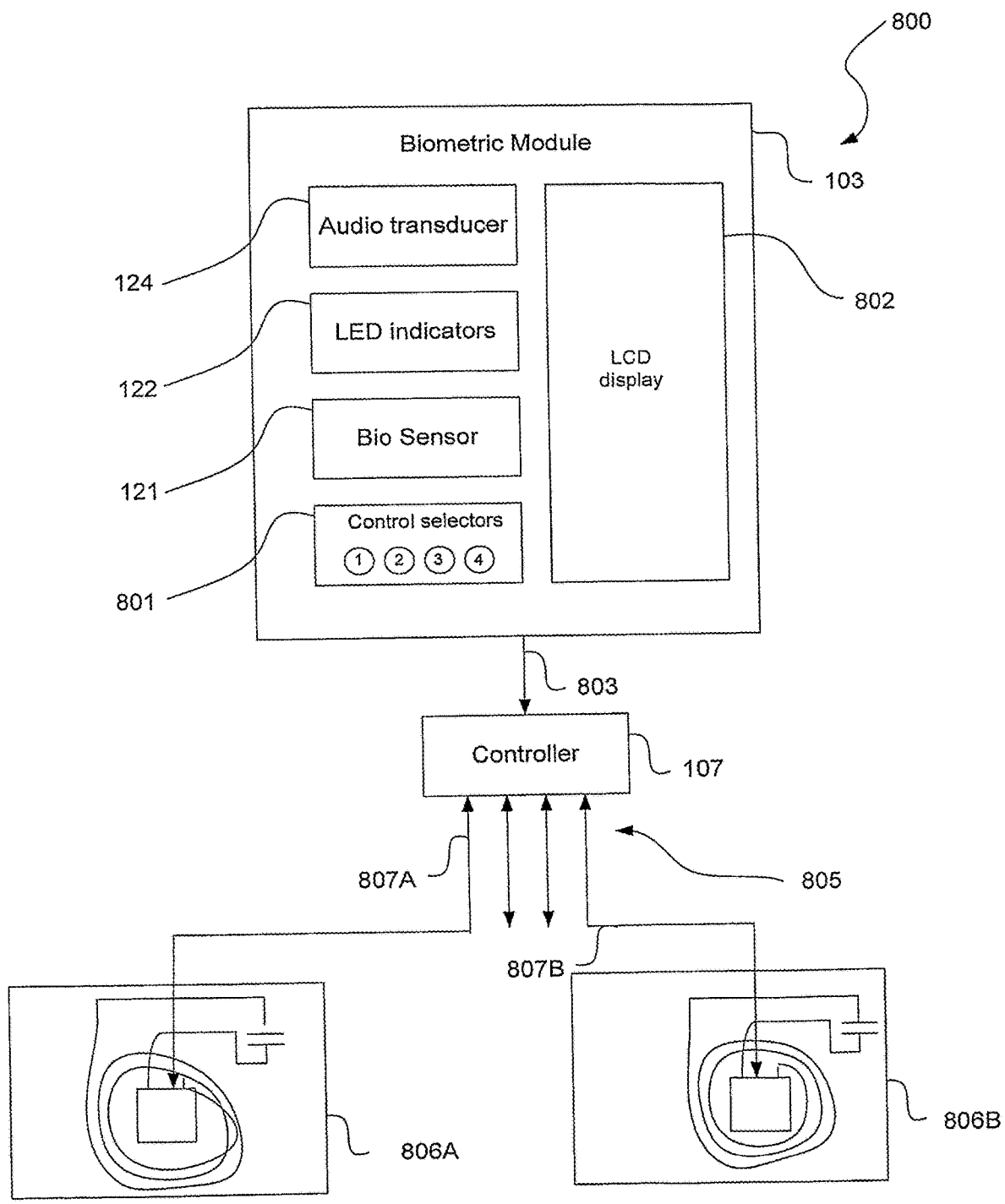
FIG. 8 shows how the secure access system of FIG. 2 can support multiple selectable proximity modules.

FIG. 8 shows how the secure access system of FIG. 2 can, using the proximity module arrangement of FIG. 7B, support multiple selectable proximity modules (e.g., 806A and 806B). FIG. 8 shows the biometric module 103 of FIG. 2 together with the audio transducer 124, the LED indicators 122 and the bio sensor 121. In this arrangement 800 however the biometric module 103 also has a set 801 of control selectors designated selectors 1-4 in the present example for selecting one or more control functions. A greater or smaller number of selectors can be incorporated as desired. Furthermore, the module 103 has an LCD display 802.

According to this arrangement, once the identity of the user 101 is authenticated successfully, the user may select one of the set 801 of the selectors such as the selector designated "1". In response to such a selection, the biometric module 103 sends a signal 803 to the controller 107. Upon receiving the signal 803, the controller 107 sends a control signal on a control line 807A to a corresponding proximity module 806A. Upon receiving the signal 807A from the controller 107, the proximity module 806A remains enabled for a predetermined period of time (e.g., four to five seconds). Within this period the proximity module 806A is enabled and may be placed by the user 101 within range of a radio frequency field being emitted by a code entry module 130. Again, the biometric module 103, the controller 107 and the plurality of the proximity modules (e.g., 806A, 806B) may, for example, be incorporated within a remote fob or mobile telephone, together with the switch module 113 and the user ID database 105. The arrangement of FIG. 8 can be used to incorporate a number of different ICs (e.g., 705A, 705B) (being the service provider specific elements in the corresponding proximity modules) in a single transmitter sub-system 116, each IC and associated proximity module being associated with a different service provider (such as VISA®, MASTERCARD®, AMERICAN EXPRESS® and so on). This arrangement would enable the user 101, after biometric authentication, to select the appropriate service provider by pressing the appropriate selector in the set 801 of selectors, and to then bring the corresponding proximity module 806A into the field emitted by the code entry module 130. In fact, all of the proximity modules incorporated into the transmitter sub-system 116 are being brought into the field emitted by the code entry module 130 however only the desired proximity module 806A is enabled by the signal 803.

The LCD display 802 can show the user 101 which service provider has been selected, thereby confirming to the user that the desired service provider has been selected. The display 802 can be provided before the user places the proximity module (e.g., 806A) into the field emitted by the corresponding code entry module 130.

In a more general case, the various selectable proximity modules (e.g., 806A, 806B) can be associated with service providers from diverse fields, namely financial, security, automotive, individual identification and so on, and can have different interfaces with the respective code entry modules such as 130. Therefore, the ICs 705A, 705B configured within the proximity modules 806A, 806B may include a combination of ICs such as the known HID™ proximity IC, iCLASS IC, and Mifare™ IC, each for a distinct application and using a different interface. The user 101 may select the desired application using the set 801 of selectors, and optionally can receive feedback on the selection via the LCD display 802.

Security and payment functionality may be combined using one or more iterations of authentication and selection, thus facilitating operation with existing infrastructure. For example, the proximity module 806A and corresponding IC 705A may contain a stored unique number for use in secure access and the proximity module 806B and corresponding IC 705B may contain a stored value for use in making cashless payments as described above.

The controller 107 may also be configured to generate a one-time dynamic "time-dependent" or "event-synchronous" password. Upon authentication of a user's biometric as described above with reference to FIG. 3, the controller 107 may access a key stored in a database (e.g., the database 115). The controller 107 may then generate a one-time time-dependent password using the key and the current time (as a dynamic input value), for example. The current time may be determined from a computer clock (not shown) configured within the arrangement 800 of FIG. 8. The password may be generated using the RSA encryption algorithm or any other suitable encryption algorithm (e.g., Data Encryption Standard (DES), Blowfish, International Data Encryption Algorithm (IDEA)).

Accordingly, a password may be generated using the current time as the input value to the encryption process. It is noted that this is merely one arrangement, and other input values such as a simple counter value or a random number may be used as with event-synchronous tokens and asynchronous challenge/response tokens. Further, other mathematical algorithms or codes can equally be used to generate the one-time password. For example, the password may be generated using a rolling code to generate a different code variant each time the password is generated. In this instance, successive passwords may be generated using a code and/or a look-up table known to both the code entry module 103 and receiver sub-system 117. Using this approach successive numbers are modified, resulting in a non-repeatable number.

The user 101 may make a payment (e.g., a VISA® payment) at a conventional (i.e., not using the proximity module) payment terminal or online by selecting the appropriate selector from the set 801, then pressing a suitable combination of the selectors 801 as guided by a display on the LCD screen 802 and waiting for a one-time password to be generated and shown on the display 802. The password may then be manually entered into the keyboard of the payment terminal or personal computer. This approach supports applications including business-to-business on line payments through to standard contactless payments at existing payment terminals.

Figure 9:
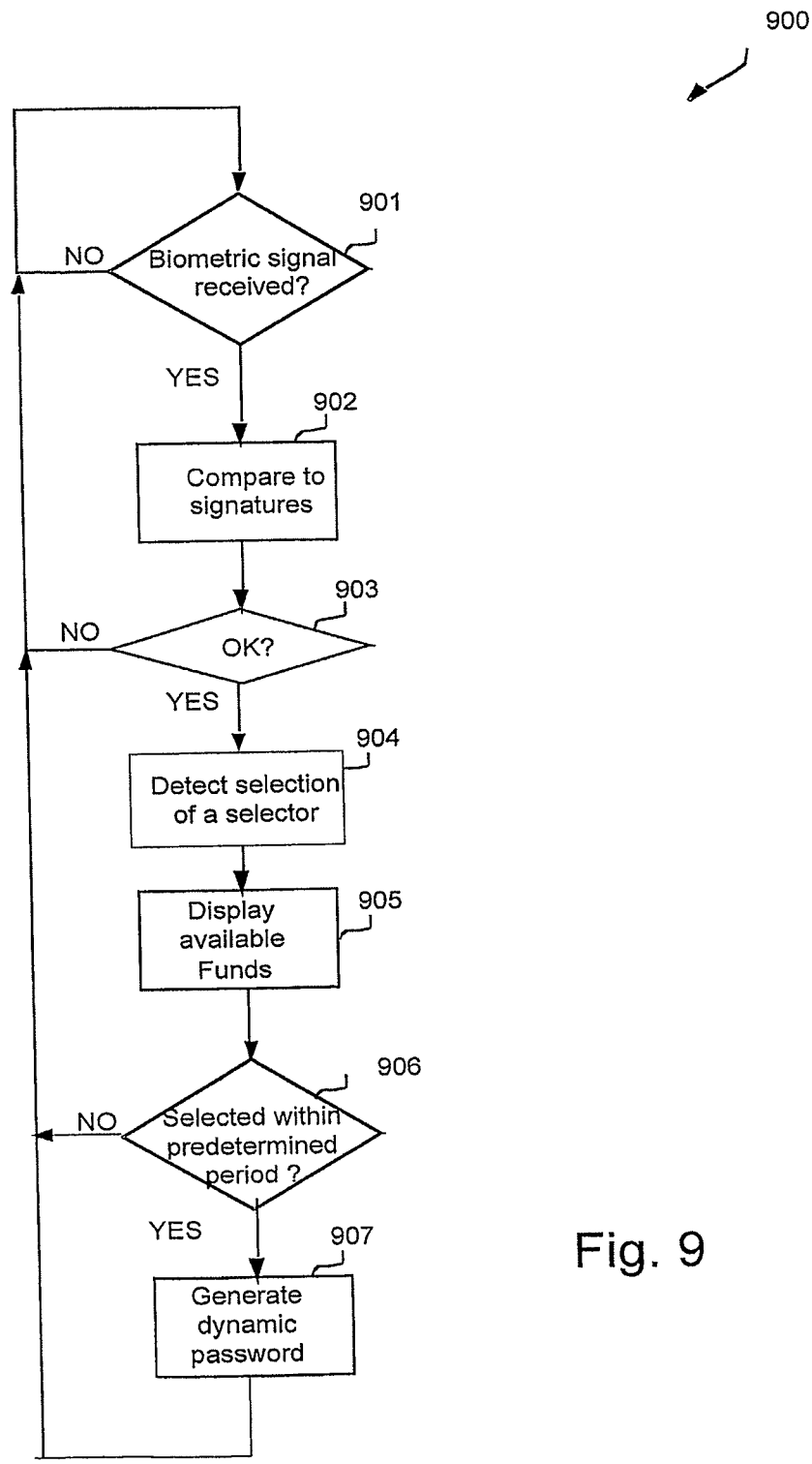
FIG. 9 shows an example of a method of operation of the arrangement of FIG. 8.

FIG. 9 shows a method 900 of operation of the arrangement 800 of FIG. 8 according to one example. In the example of FIG. 9, the user 101 generates a dynamic password using the arrangement 800 of FIG. 8. The dynamic password may then be used for making an online payment to a business website. In the present example, the online payment is being made using a VISA® account. The example provides a secure scenario as a reference to a typical transaction. However, variations of the steps of the methods described below including input from the user 101, biometric reads, generation of dynamic passwords, display of current account balances, can be used to conduct various transactions.

The method 900 of FIG. 9 may be implemented as software, such as application program modules being controlled in their execution by the controller 107 and being resident in the memory 1006 of the controller 107. The method 900 commences with a testing step 901 in which the biometric sensor 121 in the code entry module 103 checks whether a biometric signal 102 is being received. If this is not the case, then the method 900 is directed in accordance with a NO arrow back to the step 901 in a loop. If, on the other hand, the biometric signal 102 has been received, then the method 900 is directed in accordance with a YES arrow to a step 902. The step 902 compares the received biometric signal 102 with information in the biometric signature database 105 in order to ensure that the biometric signal received 102 is that of the rightful user 101.

A subsequent testing step 903 checks whether the comparison in the step 902 yields the desired authentication. If the biometric signature matching is authenticated, then the method 900 is directed in accordance with a YES arrow to a step 904. At step 904, the controller 107 detects selection of one of the selectors of the set 801. In the present example, the selector "1" of the set 801 is selected. In response to selection of the selector "1", at the next step 905, the controller 107 displays the value, stored on one of the ICs, representing available funds. In the present example, the IC 705A is a VISA® IC for making VISA® card payments and comprises the stored value. The value is displayed on the LCD 802. In the present example, the controller 107 displays $156.56 which represents the balance of the user's VISA™ account.

At the next step 906, if within a predetermined period of time (e.g., 30 seconds) the controller 107 again detects selection of the same selector (i.e., selector "1") of the set 801, then the method 900 is directed in accordance with a YES arrow to a step 907. Otherwise, the method 900 is directed in accordance with a NO arrow to the step 901. At step 907, the controller 107 generates a dynamic password (i.e., a first dynamic password), using the RSA encryption algorithm, as described above. The dynamic password is displayed on the LCD 802.

In the present example, the dynamic password generated at step 907 is "2 3 4 9 8 7 8 9". The dynamic password will be different each time it is generated. The dynamic password may be a time-dependent password where the current time is used as the input value to the encryption process. The available funds and the unique token serial number are also preferably encrypted with the generated password. Alternatively, the dynamic password may be an event-synchronous password.

Figure 10:
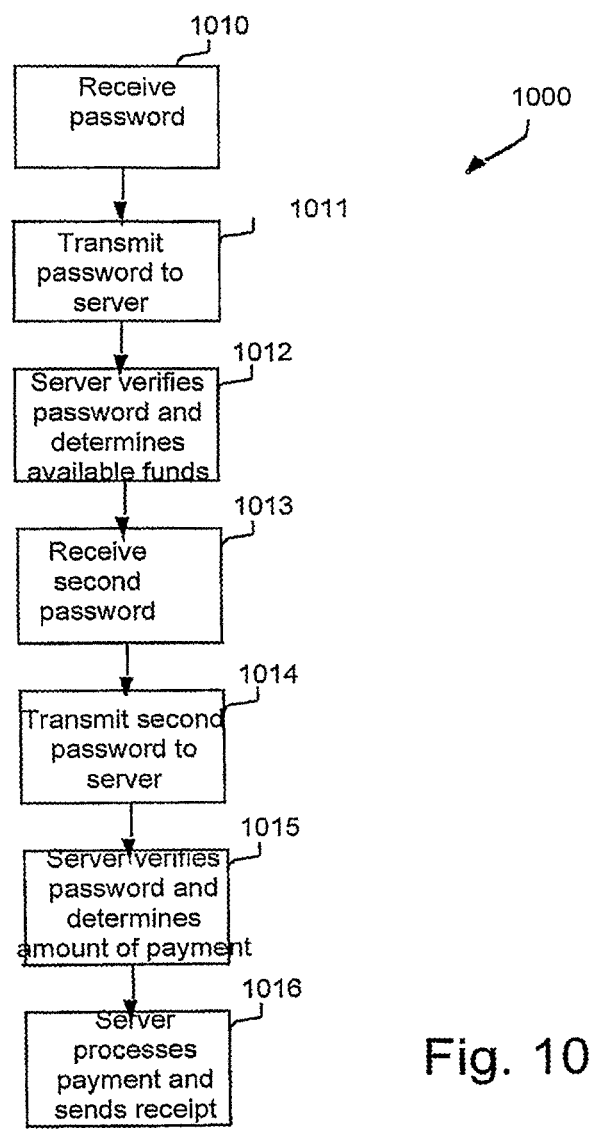
FIG. 10 shows an example of a method of making an online payment using the arrangement of FIG. 8.
Figure 11:
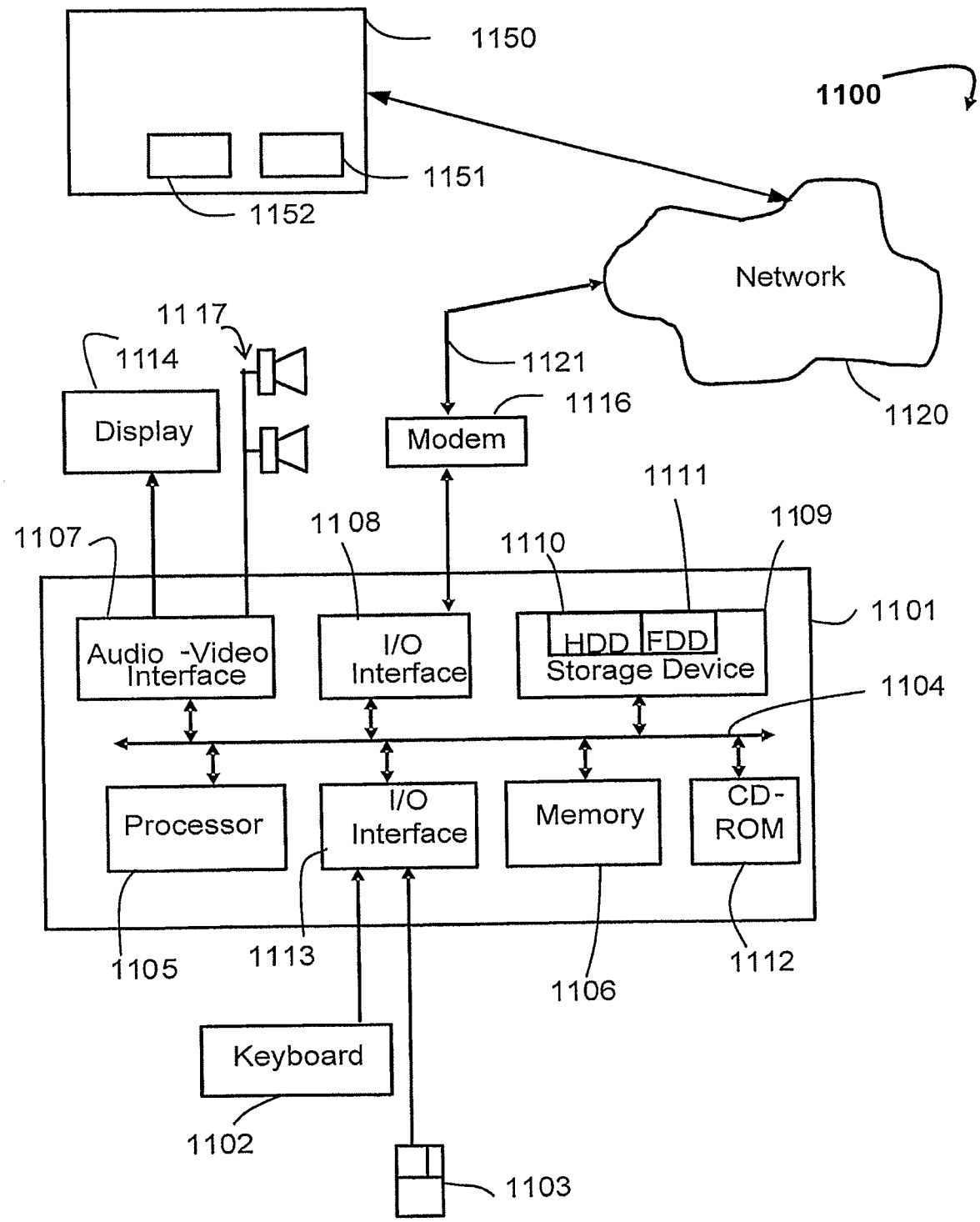
FIG. 11 is a functional block diagram of a general purpose computer system upon which the method of FIG. 10 may be implemented.

In accordance with the present example, the first dynamic password generated and displayed by the controller 107 at step 907 is entered into a computer module 1101 of a computer system 1100 as shown in FIG. 11, in order to make the online payment to the business website. The online payment is made in accordance with a method 1000 of making an online payment, which will be described in detail below with reference to FIG. 10. The method 1000 may be may be implemented using the computer system 1100, wherein the process of FIG. 10 may be implemented as software, such as one or more application programs executable within the computer system 1100. In particular, the steps of method 1000 may be effected by instructions in the software that are carried out within the computer system 1100. The instructions may be formed as one or more code modules, each for performing one or more particular tasks. The software may also be divided into two separate parts, in which a first part and the corresponding code modules performs the method 1000 and a second part and the corresponding code modules manage a user interface between the first part and the user. The software may be stored in a computer readable medium, including the storage devices described below, for example. One or more portions of the software may be stored within the computer module 1101 and also on a remote server 1150, as will be described below. The software is loaded into the computer system 1100 from the computer readable medium, and then executed by the computer system 1100. A computer readable medium having such software or computer program recorded on it is a computer program product as described above. The use of the computer program product in the computer system 1100 preferably effects an advantageous apparatus for implementing the method 1100.

As seen in FIG. 11, the computer system 1100 is formed by a computer module 1101, input devices such as a keyboard 1102 and a mouse pointer device 1103, and output devices including a printer 1115, a display device 1114 and loudspeakers 1117. An external Modulator-Demodulator (Modem) transceiver device 1116 may be used by the computer module 1101 for communicating to and from a communications network 1120 via a connection 1121. The network 1120 may be a wide-area network (WAN), such as the Internet or a private WAN. Where the connection 1121 is a telephone line, the modem 1116 may be a traditional "dial-up" modem. Alternatively, where the connection 1121 is a high capacity (e.g.: cable) connection, the modem 1116 may be a broadband modem. A wireless modem may also be used for wireless connection to the network 1120.

In accordance with the present example, a server 1150 hosting a payments website (e.g., a utility website such as the phone company or bank website) is connected to the network 1120.

The computer module 1101 typically includes at least one processor unit 1105, and a memory unit 1106 for example formed from semiconductor random access memory (RAM) and read only memory (ROM). The module 1101 also includes an number of input/output (I/O) interfaces including an audio-video interface 1107 that couples to the video display 1114 and loudspeakers 1117, an I/O interface 1113 for the keyboard 1102 and mouse 1103 and optionally a joystick (not illustrated), and an interface 1108 for the external modem 1116 and printer 1115. In some implementations, the modem 1116 may be incorporated within the computer module 1101, for example within the interface 1108. The computer module 1101 also has a local network interface 1111 which, via a connection 1123, permits coupling of the computer system 1100 to a local computer network 1122, known as a Local Area Network (LAN). As also illustrated, the local network 1122 may also couple to the wide network 1120 via a connection 1124, which would typically include a so-called "firewall" device or similar functionality. The interface 1111 may be formed by an Ethernet™ circuit card, a wireless Bluetooth™ or an IEEE 802.11 wireless arrangement.

The interfaces 1108 and 1113 may afford both serial and parallel connectivity, the former typically being implemented according to the Universal Serial Bus (USB) standards and having corresponding USB connectors (not illustrated). Storage devices 1109 are provided and typically include a hard disk drive (HDD) 1110. Other devices such as a floppy disk drive and a magnetic tape drive (not illustrated) may also be used. An optical disk drive 1112 is typically provided to act as a non-volatile source of data. Portable memory devices, such optical disks (e.g.: CD-ROM, DVD), USB-RAM, and floppy disks for example may then be used as appropriate sources of data to the system 1100.

The components 1105 to 1113 of the computer module 1101 typically communicate via an interconnected bus 1104 and in a manner which results in a conventional mode of operation of the computer system 1100 known to those in the relevant art. Examples of computers on which the described arrangements can be practised include IBM-PC's and compatibles, Sun Sparcstations, Apple Mac™ or alike computer systems evolved therefrom.

Typically, the application program(s) implementing the method 1000 are resident on the hard disk drive 1110 and read and controlled in execution by the processor 1105. Intermediate storage of such programs and any data fetched from the networks 1120 and 1122 may be accomplished using the semiconductor memory 1106, possibly in concert with the hard disk drive 1110. In some instances, the application programs may be supplied to the user encoded on one or more CD-ROM and read via the corresponding drive 1112, or alternatively may be read by the user from the networks 1120 or 1122. Still further, the software can also be loaded into the computer system 1100 from other computer readable media. Computer readable media refers to any storage medium that participates in providing instructions and/or data to the computer system 1100 for execution and/or processing. Examples of such media include floppy disks, magnetic tape, CD-ROM, a hard disk drive, a ROM or integrated circuit, a magneto-optical disk, or a computer readable card such as a PCMCIA card and the like, whether or not such devices are internal or external of the computer module 1101. Examples of computer readable transmission media that may also participate in the provision of instructions and/or data include radio or infra-red transmission channels as well as a network connection to another computer or networked device, and the Internet or Intranets including e-mail transmissions and information recorded on Websites and the like.

The second part of the application programs and the corresponding code modules mentioned above may be executed to implement one or more graphical user interfaces (GUIs) to be rendered or otherwise represented upon the display 1114. Through manipulation of the keyboard 1102 and the mouse 1103, a user of the computer system 1100 and the application may manipulate the interface to provide controlling commands and/or input to the applications associated with the GUI(s).

The method 1000 may alternatively be implemented in dedicated hardware such as one or more integrated circuits performing the functions or sub functions of FIG. 10. Such dedicated hardware may include graphic processors, digital signal processors, or one or more microprocessors and associated memories.

The method 1000 begins at step 1010, where after receiving the first password entered by the user 101, the method 1000 proceeds to step 1011. At step 1011, the password is transmitted by the processor 1105 to the server 1150 hosting the payments website. Then at the next step 1012, the server 1150 verifies the password entered by the user 101 by generating another dynamic password and comparing the passwords. In order to generate the password, the server 1150 accesses a key (associated with the user 101 of the code module 103) stored in a key database 1151 and determines the current time from a system clock 1152. In the present example, the key database 1151 may be configured within a hard disk drive (not shown) of the server 1150. The server 1150 generates the password using the key and the current time determined by encrypting a value representing the current time, using the RSA encryption algorithm, which is the same encryption algorithm used by the controller 107. Also at step 1012, the server 1150 determines available funds (i.e. $156.56) by determining the amount from the password entered by the user 101.

Figure 12:
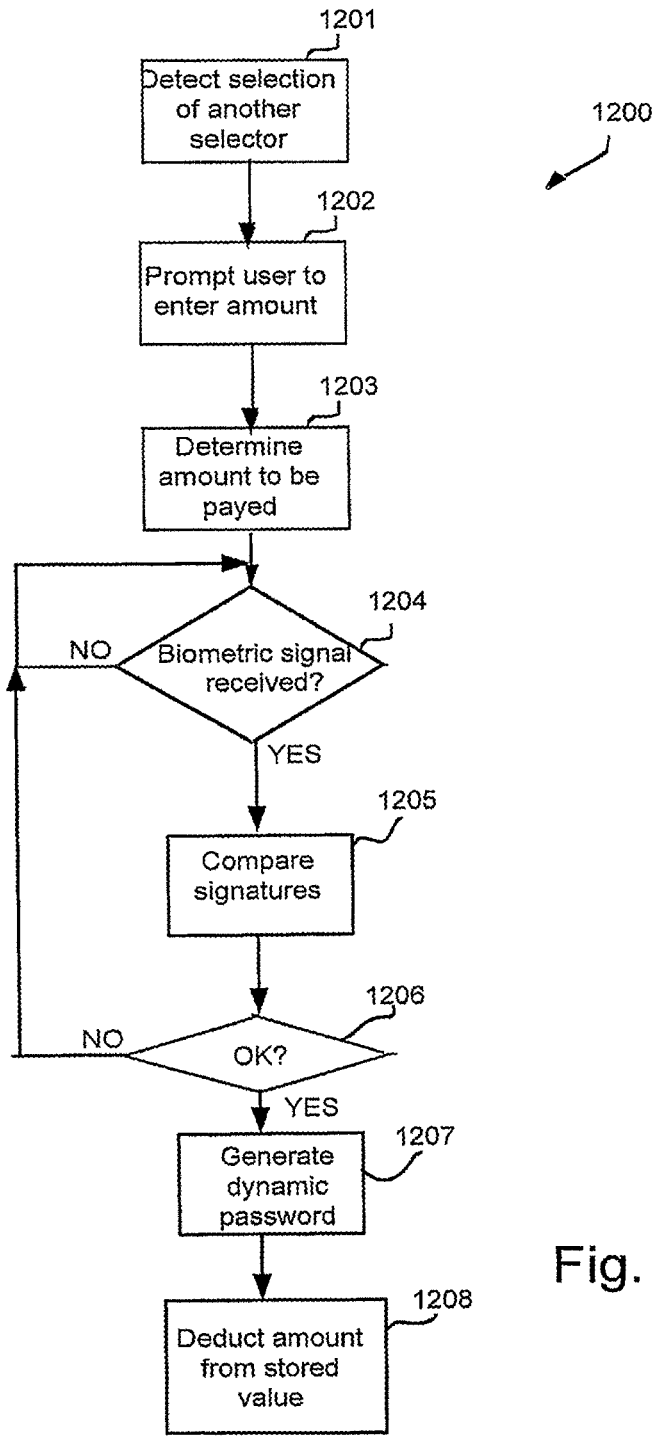
FIG. 12 shows an example of a method of debiting an amount of funds from an account stored within the transmitter sub-system of FIGS. 2 and 8.

Once the dynamic password is entered into the computer module 1101 and verified by the server 1150, the user 101 makes another request using the arrangement of FIG. 8 in order to select the amount of funds wishing to be debited from their account. The amount of funds selected by the user 101 is then debited from the value stored on the IC (e.g., 705A) corresponding to their account. FIG. 12 shows a method 1200 of debiting an amount of funds from an account.

The method 1200 commences at step 1201, where the controller 107 detects selection of another one of the selectors of the set 801. In the present example, the selector "2" of the set 801 is selected. In response to selection of the selector "2", at the next step 1202, the controller 107 prompts the user 101 to enter the amount that they wish to pay which also represents the amount to be debited from their account (i.e. their VISA® account).

At the next step 1203, the controller 107 determines the amount wished to be payed based on an amount entered by the user 101 and displays this amount on the LCD 802. The user may enter the amount using the set of control selectors 801. For example, the controller 107 may display a generic amount and the user may select "3" of the set 801 to increase a displayed amount and "4" to decrease the displayed amount.

The next step 1204 is a testing step in which the biometric sensor 121 in the code entry module 103 checks whether a biometric signal 102 is being received. If this is not the case, then the method 1200 is directed in accordance with a NO arrow back to the step 1206 in a loop. If, on the other hand, the biometric signal 102 has been received, then the method 1200 is directed in accordance with a YES arrow to a step 1205. The step 1205 compares the received biometric signal 102 with information in the biometric signature database 105 in order to ensure that the biometric signal received is that of the rightful user 101.

A subsequent testing step 1206 checks whether the comparison in the step 1205 yields the desired authentication. If the biometric signature matching is authenticated, then the method 1200 is directed in accordance with a YES arrow to a step 1207. At step 1207, the controller 107 generates a second dynamic password, using the RSA encryption algorithm with the current time being used as the input value to the encryption process, as described above. The dynamic password is displayed on the LCD 802. In the present example, the dynamic password generated at step is "5 6 8 8 8 1 8 9". Again, the second dynamic password is a time-dependent password. However, the second password may also be an event-synchronous password. The amount determined at step 1203 representing the amount of funds to be payed is also encrypted within the dynamic password. The method 1200 concludes at the next step 1208, where the amount of funds entered by the user at step 1203 is deducted from the value stored on the IC 705A.

In accordance with the present example, the second dynamic password generated and displayed by the controller 107 at step 1207 is entered into the computer module 1101 to complete the online payment to the business website.

Returning to FIG. 10, at the next step 1013, after receiving the second dynamic password entered by the user 101, the method 1000 proceeds to step 1014. At step 1014, the second password is transmitted by the processor 1105 to the server 1150 hosting the payments website. Then at the next step 1015, the server 1150 verifies the password entered by the user 101 by generating still another dynamic password and comparing the passwords as described above. In order to generate this still further password, the server 1150 accesses the key (associated with the user 101 of the code module 103) stored in the key database 1151 and determines the current time from the system clock 1152, as described above. Also at step 1015, the server 1150 determines the amount to be paid by decrypting the amount from the second password entered by the user 101.

The method 1000 concludes at the next 1016, where the payment is processed by the server 1150. The payment transaction can be reconciled to the customer in a monthly statement.

Variations on the methods described above can also be used for secure access, for example, to gain entry to a building. For example, the dynamic password generated at step 907 may be entered into a keypad located on a door jamb and being connected to a building security system. In this instance, rather than representing an account balance, the stored value encrypted within the dynamic password can be a personal identification number (PIN) stored with the transmitter sub-system 116. The building security system then verifies the password entered by the user 101 by generating another dynamic password and comparing the passwords. Thus, the PIN used for secure access is enhanced through the need of a biometric signature.

The dynamic passwords generated at step 907 may have other user information encrypted within the dynamic password including a serial number related to the transmitter sub-system (configured within a telephone or fob), time of access, type of account and validated finger (e.g., middle finger).

The arrangement of FIG. 8 comprises multiple selectable proximity modules (e.g., 806A, 806B) each configured in accordance with the arrangement of FIG. 7B. In an alternative arrangement, one antenna (e.g., 707) may be associated with multiple ICs (e.g., all connected in parallel with the antenna). Again, in this instance, each of the ICs may be separately selectable using separate control lines (e.g., 807A, 807B).

Figure 13:
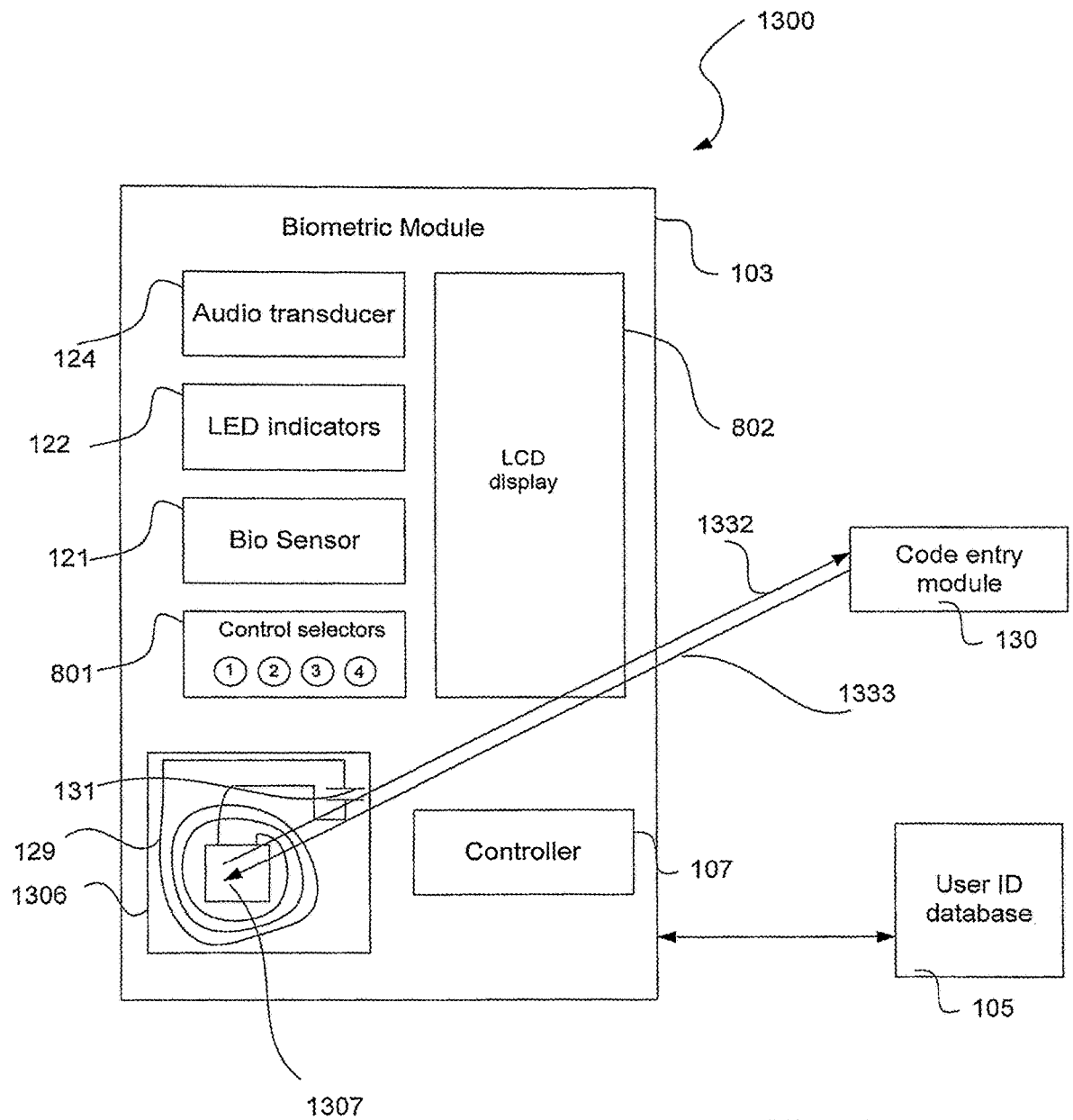
FIG. 13 shows how the secure access system of FIG. 2 can support one or more conventional proximity modules according to another embodiment.

FIG. 13 shows how the secure access system of FIG. 2 can, using one or more conventional proximity modules, be used to perform a secure transaction. FIG. 13 shows the biometric module 103 of FIG. 2 together with the audio transducer 124, the LED indicators 122 and the bio sensor 121, and a set 1301 of control selectors designated selectors 1-4 in the present example for selecting one or more control functions. The module 103 also has an LCD display 802. The arrangement 1300 also has a proximity module 1306. The proximity module 1306 comprises the coil 129, the capacitor 131 and an IC 1307.

In the arrangement 1300 of FIG. 13, the proximity module 1306 is configured to be constantly available to be activated, upon being placed within the field of the code entry module 130 in a conventional manner, without the need for a control signal such as the control signal 803. That is, no biometric verification is required in the arrangement 1300 in order to activate the proximity module 1306.

The arrangement 1300 may also be used to perform secure transactions or the like, including an online transaction. Rather than the biometric verification being needed in order to activate the proximity module 1306, the generation of a dynamic password, as described above, may be utilised to provide an additional security layer, as will be described below.

A method 1400 of performing a transaction using the arrangement 1300 of FIG. 13 will now be described with reference to FIG. 14. The method 1400 begins with a testing step 1401 in which the biometric sensor 121 in the code entry module 103 checks whether a biometric signal 102 is being received. If this is not the case, then the method 1400 is directed in accordance with a NO arrow back to the step 1401 in a loop. If, on the other hand, the biometric signal 102 has been received, then the method 1400 is directed in accordance with a YES arrow to a step 1402. The step 1402 compares the received biometric signal 102 with information in the biometric signature database 105 in order to ensure that the biometric signal received 102 is that of the rightful user 101.

A subsequent testing step 1403 checks whether the comparison in the step 1402 yields the desired authentication. If the biometric signature matching is authenticated, then the method 1400 is directed in accordance with a YES arrow to a step 1404 where the match is indicated to the user 101 on the display 802. Also at step 1404, the controller 107 detects selection of one of the selectors of the set 801. In the present example, the selector "1" of the set 801 is selected by the user 101. In response to selection of the selector "1", at the next step 1405, the controller 107 generates a dynamic password, using the RSA encryption algorithm, as described above, and displays the dynamic password on the LCD 802. The dynamic password is generated based on a card number (associated with the user) stored on the IC 1307. In the present example, the dynamic password generated at 1405, is entered into a keypad or the like (not shown) associated with the code entry module 130. The card number may be encrypted within the dynamic password.

Then at the next step 1406, upon the proximity module 1306 being placed within the field of the code entry module 130, the coil 129 is excited and charges the capacitor 131, which in turn energizes the IC 1307. The IC 1307 then transmits, as depicted by an arrow 1332, the card number stored within the IC 1307, via the coil 1306, to the code entry module 130. A controller (e.g., 109) associated with the code entry module 130 then uses the card number to verify the dynamic password as described above. In particular, the controller of the code entry module 130 generates a dynamic password, using the RSA encryption algorithm, using the card number, and compares the generated password to the password entered by the user 101. Again, the passwords generated at step 1405 and by the controller may be time-dependent or event-synchronous.

At the next step 1406, the proximity module 1306 receives a signal, as depicted by the arrow 1333, from the code entry module 130. Then at the next step 1407, the IC 1307 decrements the stored value by a predetermined amount. This predetermined amount may represent a payment for a trip on a bus, for example. In another alternative embodiment, the signal 1333 received from the code entry module 130 may include a value indicating an amount that needs to be decremented from the stored value in step 1407. In this instance, the IC 1307 decrements the stored value by the amount represented by the value received from the code entry module 130. Accordingly, the stored value is decremented by an amount (i.e., either predetermined or variable) depending on the information (such as the card number) contained in the secure access signal 132 and the proximity module 126 never has to leave the user's hand. Following step 1407, the method 1400 is then directed in accordance with an arrow 1408 back to the step 1401.

Figure 14:
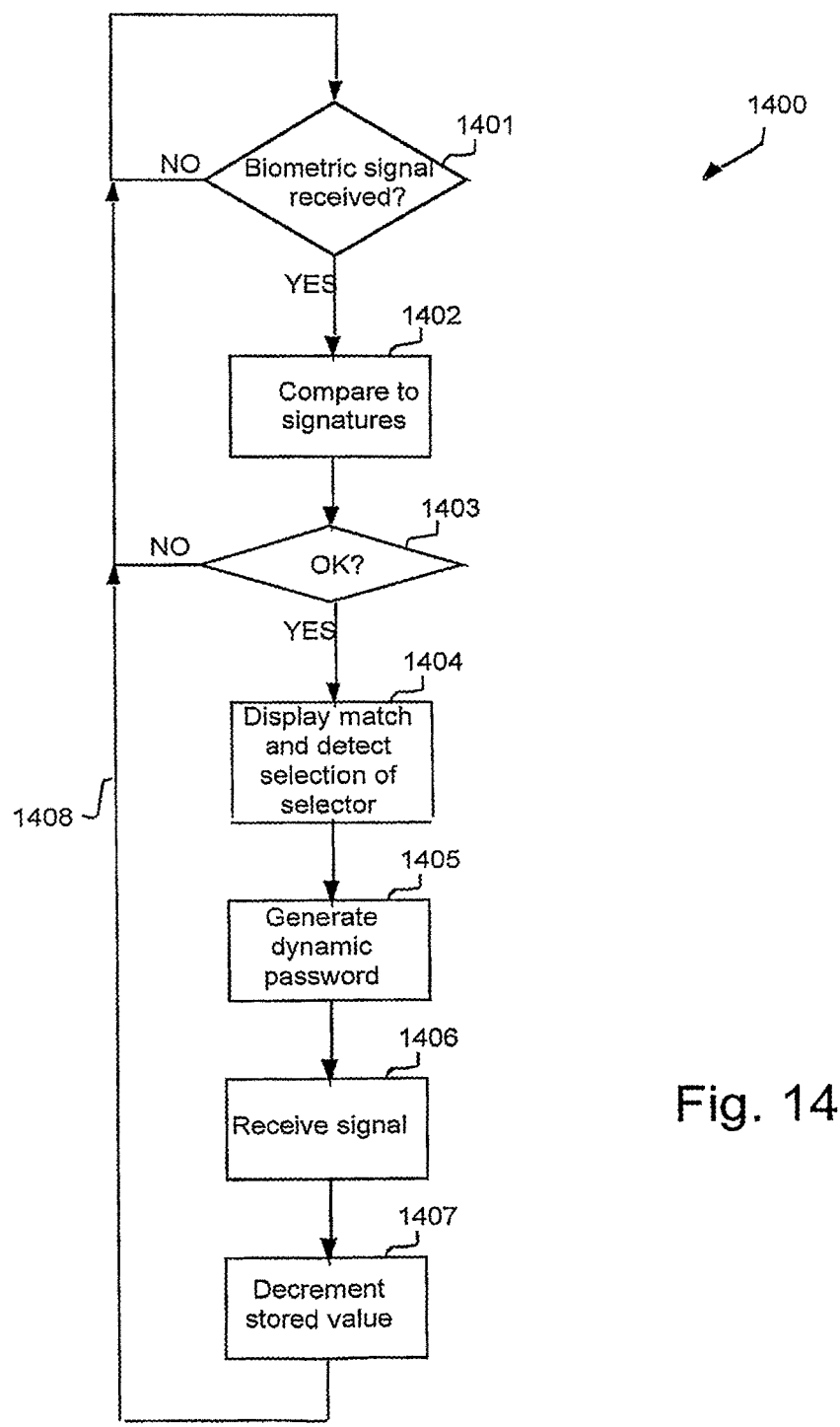
FIG. 14 shows an example of a method of performing a secure transaction using the arrangement of FIG. 13.

Accordingly, in the example of FIGS. 13 and 14, the dynamic password generated on the basis of a valid biometric reading, is used to verify the user of the arrangement 1300. Although in the example of FIGS. 13 and 14, the dynamic password was generated first, in alternative arrangements the dynamic password may follow or accompany a payment.

The arrangements described above, including the arrangement 1300 of FIG. 13, may also be used with automatic teller machines (ATMs) or point of sale (POS) devices where a personal identification number (PIN) has conventionally been used to verify the validity of a card (i.e., magnetic stripe card or smart card) owner. The dynamic password generated on the basis of a valid biometric reading may be used to replace such a FIN, without affecting a conventional transaction. For example, in the case of an ATM transaction or electronic funds transfer point of sale (EFTPOS) transaction, a user inserts their magnetic stripe card (or smart card) into the ATM or swipes the card using an EFTPOS terminal. A card number corresponding to the magnetic stripe card is stored on the IC 1307. At the same time as inserting or swiping their card, the user may use the arrangement 1300 described above to generate a time-dependent or event-synchronous dynamic password based on a valid biometric reading. Again, the card number corresponding to the magnetic stripe card may be encrypted within the generated password. The user then enters the generated dynamic password into the ATM or EFTPOS terminal. The dynamic password is then verified by a back-end host server (e.g., associated with a bank) in the manner described above based on the card number.

The arrangements described above, including the arrangement 1300 of FIG. 13, may also be used for making an online payment. Again, the dynamic password may be used to replace the user's password which has conventionally been used. At the same time as logging into a banking website, for example, the user may use the arrangement 1300 described above to generate a time-dependent or event-synchronous dynamic password based on a valid biometric reading. Again, a user identification number corresponding to the user may be encrypted within the generated password. The user then enters the generated dynamic password into a personal computer. The dynamic password is then verified by a back-end host server (e.g., associated with a bank) connected to the personal computer in the manner described above based on the user's identification number encrypted with the entered password.

The arrangements described above, including the arrangement 1300 of FIG. 13 may stop intruders from stealing credit and debit cards for later fraudulent use in ATM and POS devices. The owner or user of a magnetic stripe card would also require the fob or mobile telephone with the card number corresponding to the magnetic stripe card stored thereon. A new dynamic password could then be generated for each ATM or EFTPOS transaction. The dynamic password overcomes the inherent weaknesses in PIN type inputs, due to the dynamic nature of the password and requirement to validate the owner or user biometrics prior to generating that password. If an intruder views a dynamic password input, they cannot replicate it a next time as the password is constantly changing.

Although the arrangement 1300 of FIG. 13 has been described as including the proximity module 1307, the arrangement 1300 may not necessarily include such proximity module 1307. An arrangement without a proximity module may also be used to perform the transactions described above including ATM, EFTPOS and online transactions merely by generating a dynamic password as described above.

The arrangements described above allow biometric security to be easily integrated with existing infrastructure for payment or access systems. The arrangements are simple and effective for secure proof of identity. The user does not need to remember a code, number, name or combination. The arrangements may be used online or offline. The described arrangements may also be used in wireless systems, alarm panel activation, garage control, door access, boom-gate access and anywhere long distance secure transmissions are required.

INDUSTRIAL APPLICABILITY

It is apparent from the above that the arrangements described are applicable to the security industry.

The foregoing describes only some embodiments of the present invention, and modifications and/or changes can be made thereto without departing from the scope and spirit of the invention, the embodiments being illustrative and not restrictive.

The system 100 can also be used to provide authorised access to lighting systems, building control devices, exterior or remote devices such as air compressors and so on. The system 100 may also be used to gain access to online applications. For example, as described above, the transmitter sub-system 116 may be used to generate a one-time dynamic password for use in online banking applications or the like. The concept of "secure access" is thus extendible beyond mere access to restricted physical areas.

Although the present specification has described communication between the transmitter sub-system 116 and the receiver sub-system being performed using RF, other communication modes such as capacitive coupling or infra-red could also be used.

The arrangements described above may comprise a "duress" or "alarm" feature. This feature may be activated using a different predetermined biometrics. For example, typically the user may present a particular finger (e.g., their thumb) for verification prior to enabling the proximity module (e.g., 126) or generating a dynamic password. If the valid user is under duress by an intruder, the valid user can use an alternate finger (e.g., their index finger) to enable the proximity module and/or generate a dynamic password, for example. Use of the alternate finger may automatically activate an alarm, thereby bringing emergency services to the situation. Alternatively, the dynamic password generated based on the alternate finger may include an encrypted alarm notification. In this instance, when the generated password is entered into a keypad, keyboard or the like, an alarm will be automatically activated by a backend controller or server, again bringing the emergency services to the location.

Generating different dynamic passwords based on the verification of different biometrics may also be used where multiple access areas are selectable from a single point. For example, the arrangements described above (e.g., the arrangement 1300) may be configured so that a user's thumb may be read and verified, as described above, in order to generate a first dynamic password. The first password may be entered into a keypad, for example, to allow the user to enter a first door "1". The user may then present a different finger (e.g., the person's index finger) which once verified may result in the generation of a second dynamic password. The second password may be entered into a keypad, for example, to allow the user to enter a second door "2".

The invention claimed is:

1. A cellular telephone configured to transmit a secure signal to a system for performing a secure transaction, the cellular telephone comprising:
 a biometric sensor;
 a display;
 a selector through which user input is received;
 a switch;
 a proximity circuit arrangement coupled to the switch, the proximity circuit arrangement providing a plurality of proximity circuits associated with a plurality of corresponding financial accounts;
 a controller configured to:
 present data representative of a plurality of financial accounts on the display;
 receive, via the selector, a user input indicative of a selected financial account selected from the presented data representative of the plurality of financial accounts;
 present, via the display, feedback indicating the selected financial account;
 prompt input of biometric signal via the biometric sensor;
 receive, via the biometric sensor, a biometric signal;
 perform a matching process, thereby to seek matching of the received biometric signal with a biometric signature contained in memory of the cellular telephone;
 in the case that the matching is successful, configure the proximity circuit arrangement to provide the one of the plurality of proximity circuits associated with the selected financial account to transmit a secure signal conveying information to the system when the proximity circuit is placed within range of a radio frequency field emitted by the system;
 wherein a secure transaction is performed based on the information conveyed within the transmitted secure signal in order to adjust a financial account associated with the matched biometric signature by an amount provided by the system;
 wherein a database of biometric signatures is maintained using the cellular telephone by a user corresponding to the biometric signature contained in the memory of the cellular telephone; and
 wherein the biometric sensor of the cellular telephone is used to store the biometric signatures contained in the memory of the cellular telephone.

2. The cellular telephone of claim 1, wherein the biometric sensor is configured to receive the biometric signal in one of the following forms: retinal pattern, iris pattern, face pattern, and palm configuration.

3. The cellular telephone claim 1, wherein at least one proximity circuit of the plurality of proximity circuits is further configured to unlock an automobile.

4. The cellular telephone of claim 1, further comprising at least one light-emitting diode (LED).

5. The cellular telephone of claim 1, wherein at least one proximity circuit of the plurality of proximity circuits includes at least one coil.

6. The cellular telephone of claim 5, wherein at least one proximity circuit of the plurality of proximity circuits further comprises an inductor and a capacitor.

7. The cellular telephone of claim 1, wherein at least one proximity circuit of the plurality of proximity circuits is configured to activate an automobile engine.

8. The cellular telephone of claim 1, wherein said biometric sensor is further configured to allow the user to gain access to an application.

9. The cellular telephone of claim 1, further comprising a processor configured to generate passwords for use by the user.

10. The cellular telephone of claim 1, wherein said secure transaction identifying the financial account associated with the user comprises a number of the financial account associated with the user.

11. The cellular telephone of claim 1, wherein secure transaction identifying the financial account associated with the user comprises a token generated by the cellular telephone.

12. The cellular telephone of claim 1, wherein at least one proximity circuit of the plurality of proximity circuits is configured to communicate with a magnetic stripe card reader.

13. The cellular telephone of claim 1, further comprising at least one infrared emitter.

14. A method for operating a cellular telephone to transmit a secure signal to a system for performing a secure transaction, the method including:
 presenting on a display unit of the cellular telephone data representative of a plurality of financial accounts;
 receiving, via a selector of the cellular telephone through which user input is received, the user input indicative of a selected financial account selected from the plurality of financial accounts presented;
 presenting, via the display, feedback indicating the selected financial account;
 prompt input of a biometric signal via a biometric sensor of the cellular telephone;
 receiving, via the biometric sensor, a biometric signal;
 performing a matching process, thereby to seek matching of the received biometric signal with a biometric signature contained in physical memory of the cellular telephone; and
 in the case that the matching is successful, configuring a proximity circuit arrangement provided by the cellular telephone to provide a proximity circuit, in the proximity circuit arrangement and corresponding to the selected financial account, to transmit a secure signal conveying information to the system when the proximity circuit is placed within range of a radio frequency field emitted by the system, wherein the proximity circuit arrangement is controllable to be configured to provide a plurality of proximity circuits associated with a plurality of corresponding financial accounts;
 wherein a secure transaction is performed based on the information conveyed within the transmitted secure signal in order to adjust a financial account associated with the matched biometric signature by an amount provided by the system;
 wherein a database of biometric signatures is maintained using the cellular telephone by a user corresponding to the biometric signature contained in the physical memory of the cellular telephone; and wherein the biometric sensor of the cellular telephone is used to store the biometric signatures contained in the physical memory of the cellular telephone.

\* \* \* \* \*